United States Patent

Hartung

[11] Patent Number: 5,876,212
[45] Date of Patent: Mar. 2, 1999

[54] APPARATUSES AND KITS FOR TEACHING MATHEMATICS

[75] Inventor: Paul G. Hartung, Greenwood Township, Columbia County, Pa.

[73] Assignee: Safe-T Products, Inc., Villa Park, Ill.

[21] Appl. No.: 757,210

[22] Filed: Nov. 27, 1996

Related U.S. Application Data

[60] Provisional application No. 60/007,634, Nov. 28, 1995.

[51] Int. Cl.$^6$ ....................................................... G09B 1/00
[52] U.S. Cl. ........................ 434/207; 434/188; 434/283; 434/300; 434/367; 434/433
[58] Field of Search ................................... 434/187, 188, 434/202, 211, 215, 207, 236, 283, 300, 367, 433; 273/153 R

[56] References Cited

U.S. PATENT DOCUMENTS

| | | | |
|---|---|---|---|
| 3,095,655 | 7/1963 | Berglund et al. | 434/188 |
| 3,295,227 | 1/1967 | Suchman | 434/236 |
| 3,424,455 | 1/1969 | Dunson | 273/153 R |
| 3,625,516 | 12/1971 | Handweller et al. | 273/153 R |
| 3,661,393 | 5/1972 | Skebeck | 273/153 R |
| 3,805,415 | 4/1974 | Orfei | 434/236 |
| 3,892,050 | 7/1975 | Micciche | 434/433 |
| 3,979,840 | 9/1976 | Waggoner et al. | 434/433 |
| 4,195,421 | 4/1980 | Tucker et al. | |
| 4,560,354 | 12/1985 | Fowler | |
| 5,033,968 | 7/1991 | Hecht | |
| 5,169,317 | 12/1992 | Hollander | |
| 5,299,806 | 4/1994 | Fifer, Jr. | 434/203 X |

FOREIGN PATENT DOCUMENTS

| | | |
|---|---|---|
| 0135633 | 4/1985 | European Pat. Off. |
| 1288300 | 9/1972 | United Kingdom |
| 2193028 | 1/1988 | United Kingdom |

*Primary Examiner*—Jeffrey A. Smith
*Attorney, Agent, or Firm*—Laff, Whitesel, Conte & Saret, Ltd.

[57] ABSTRACT

A method and apparatus of teaching mathematical problem solving includes using a series of containers, each consisting of an inherent problem requiring the use of mathematical skills for solution. The series of containers meets all conditions for the teaching of mathematics as recommended by the National Council of Teachers of Mathematics in their 1989 document "The Standards". The complete solution satisfying "The Standards" for each container ordinarily takes a period of days. A kit consisting of such containers is disclosed.

33 Claims, 17 Drawing Sheets

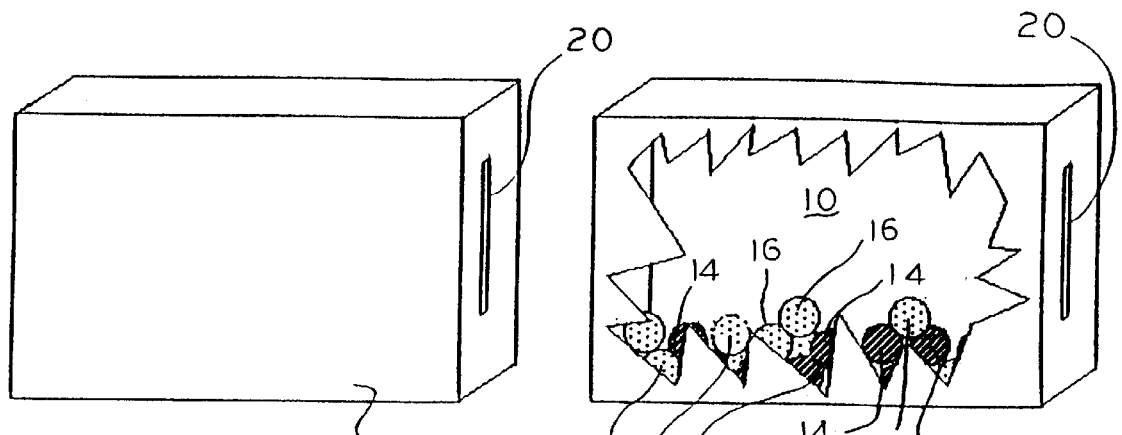
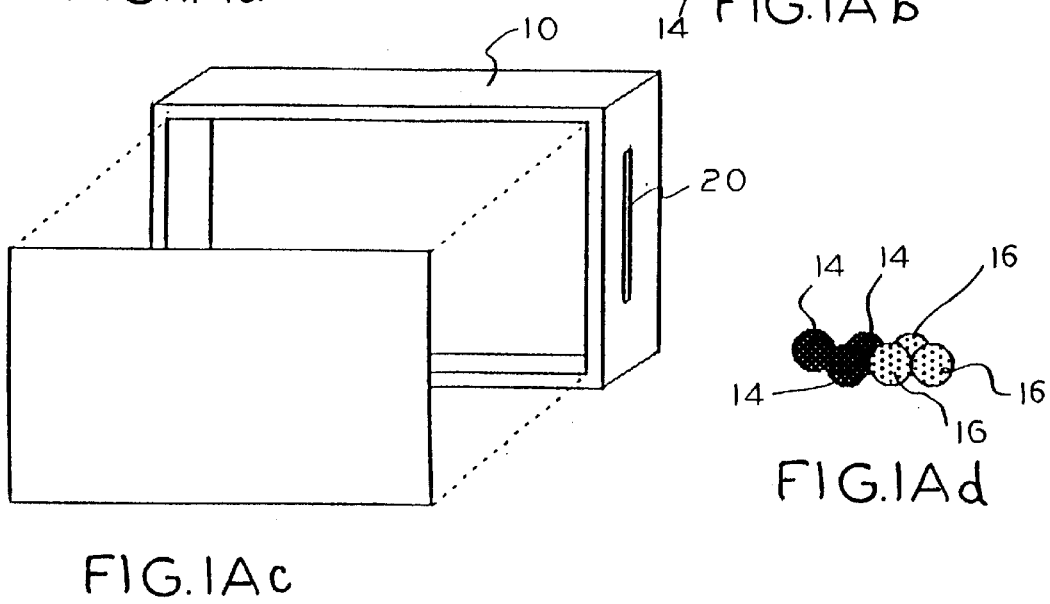

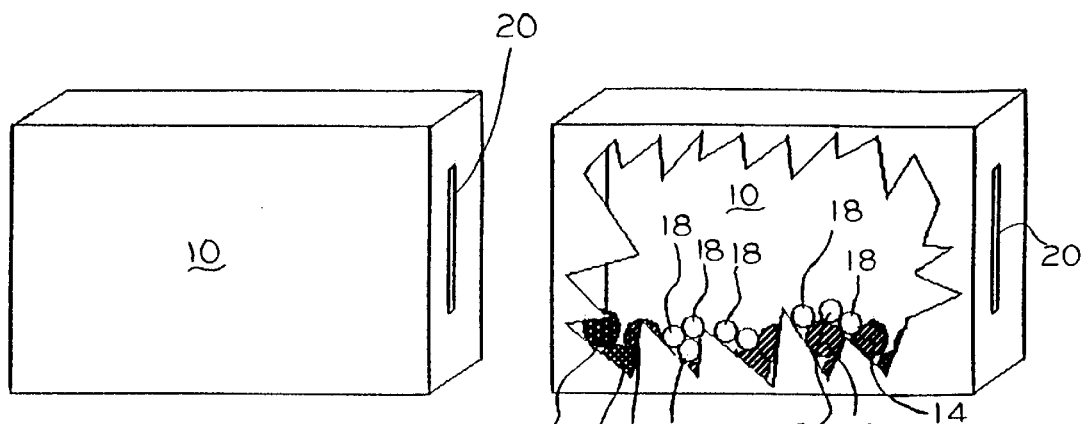
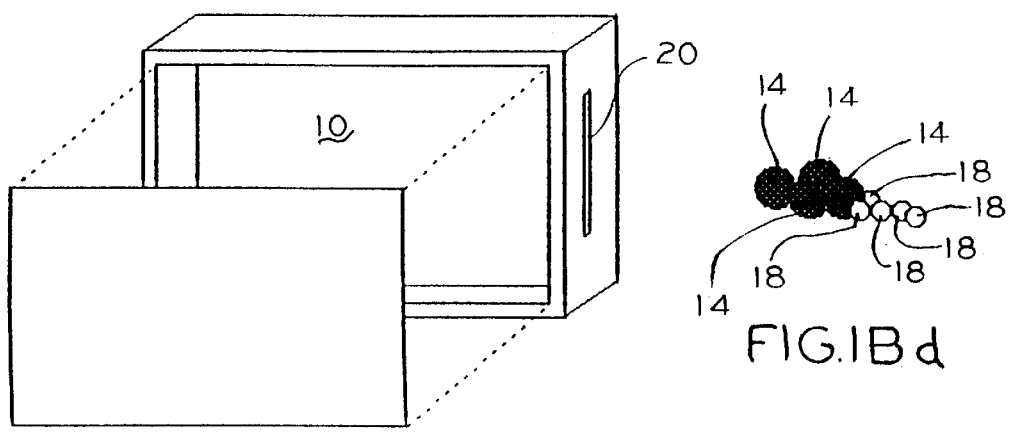

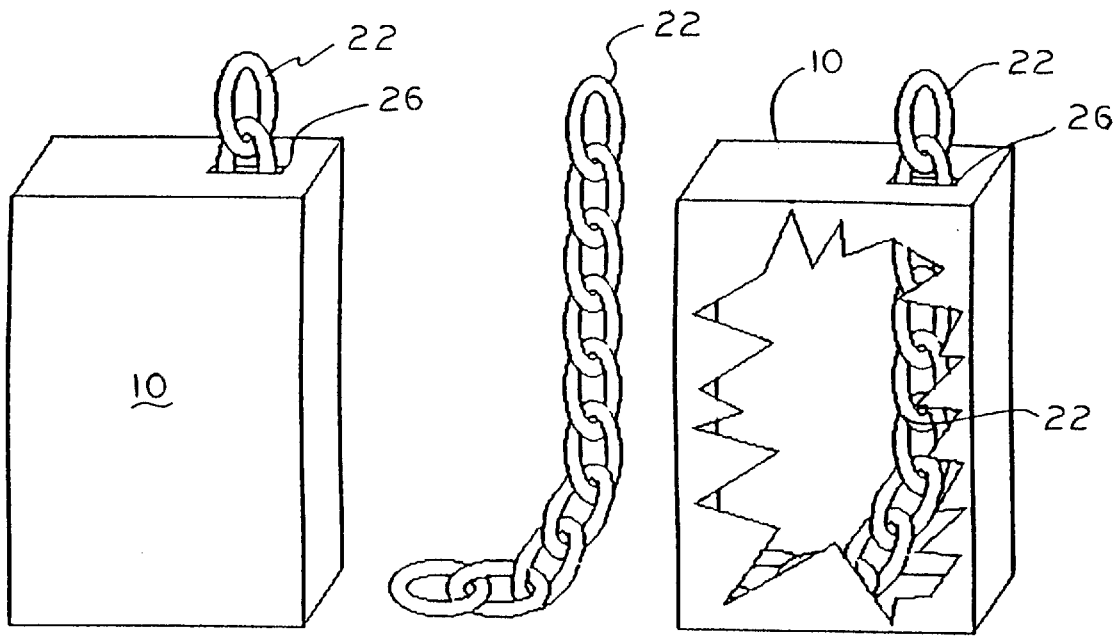
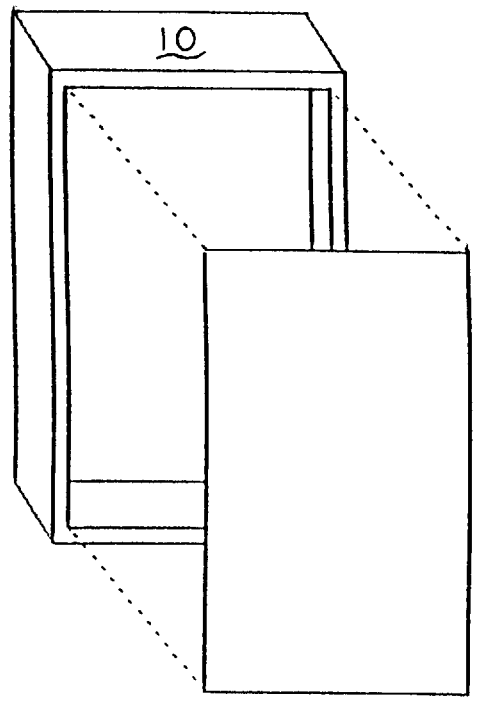
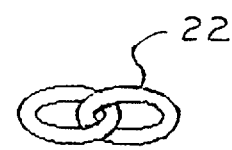
FIG.2Aa  FIG.2Ab  FIG.2Ac
FIG.2Ad
FIG.2Ae

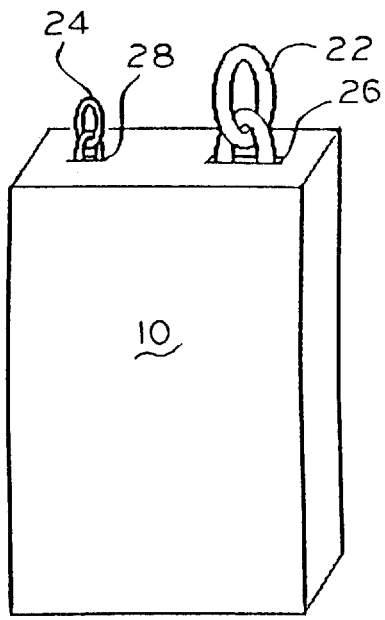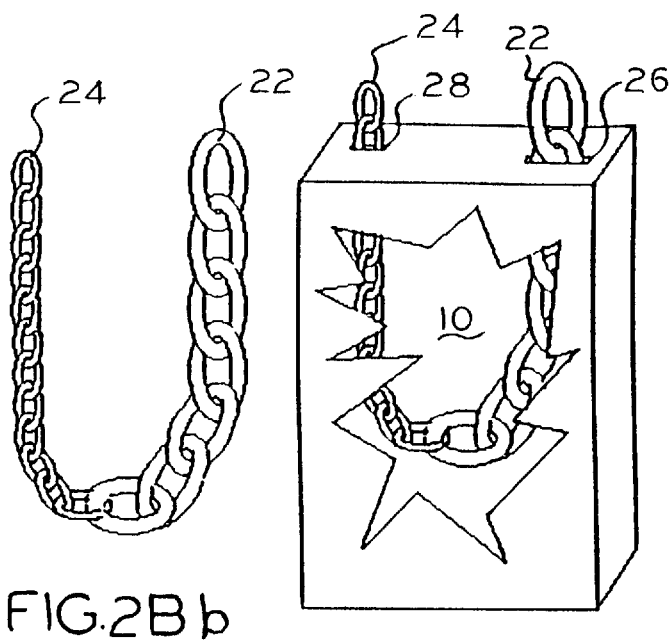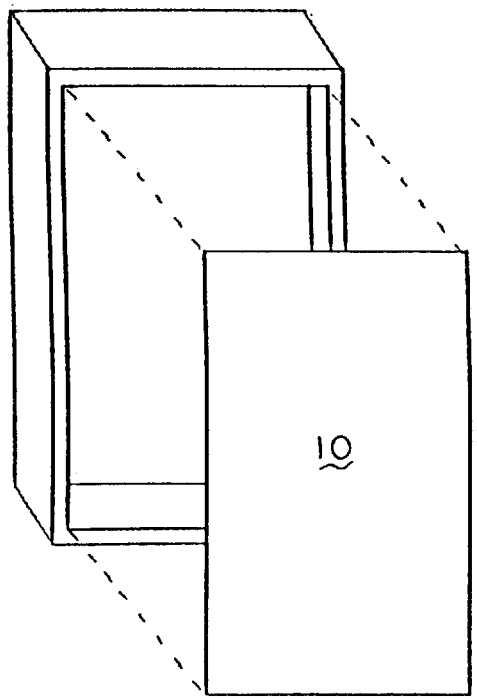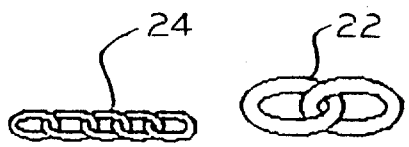
FIG.2Ba
FIG.2Bb
FIG.2Bc
FIG.2Bd
FIG.2Be  FIG.2Bf

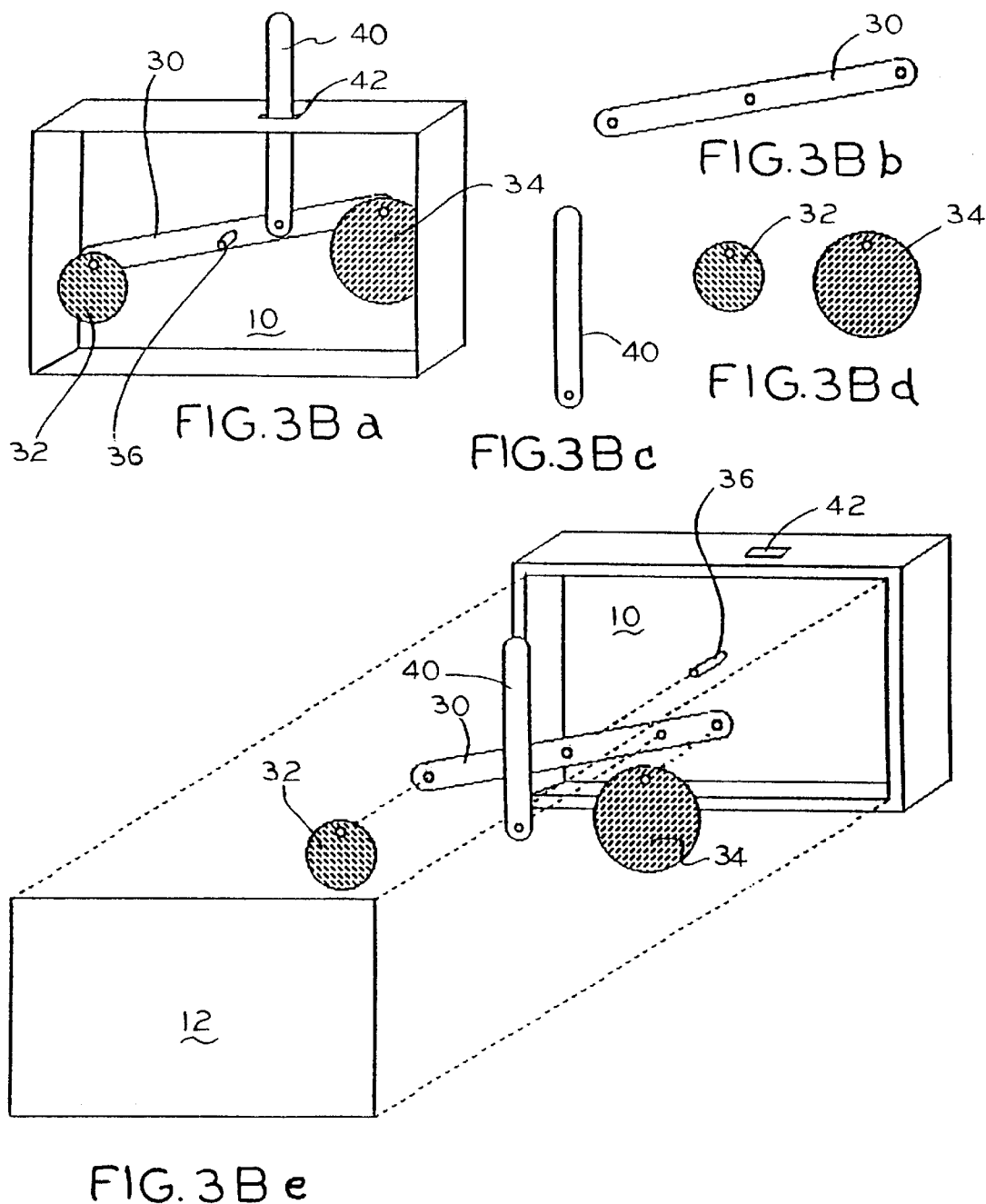

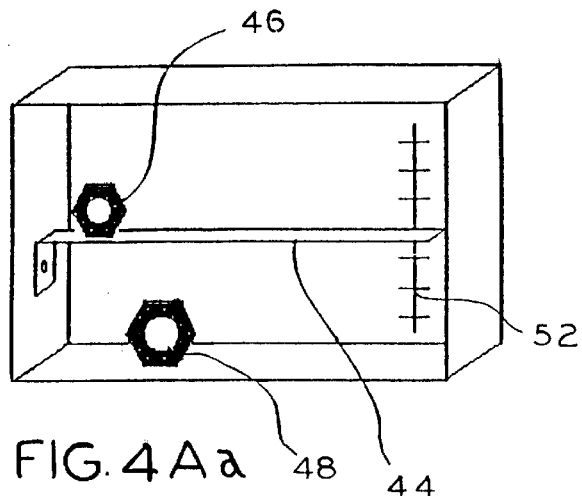
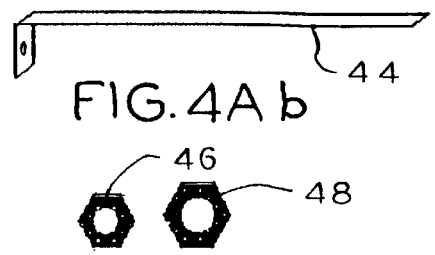
FIG.4Aa
FIG.4Ab
FIG.4Ac
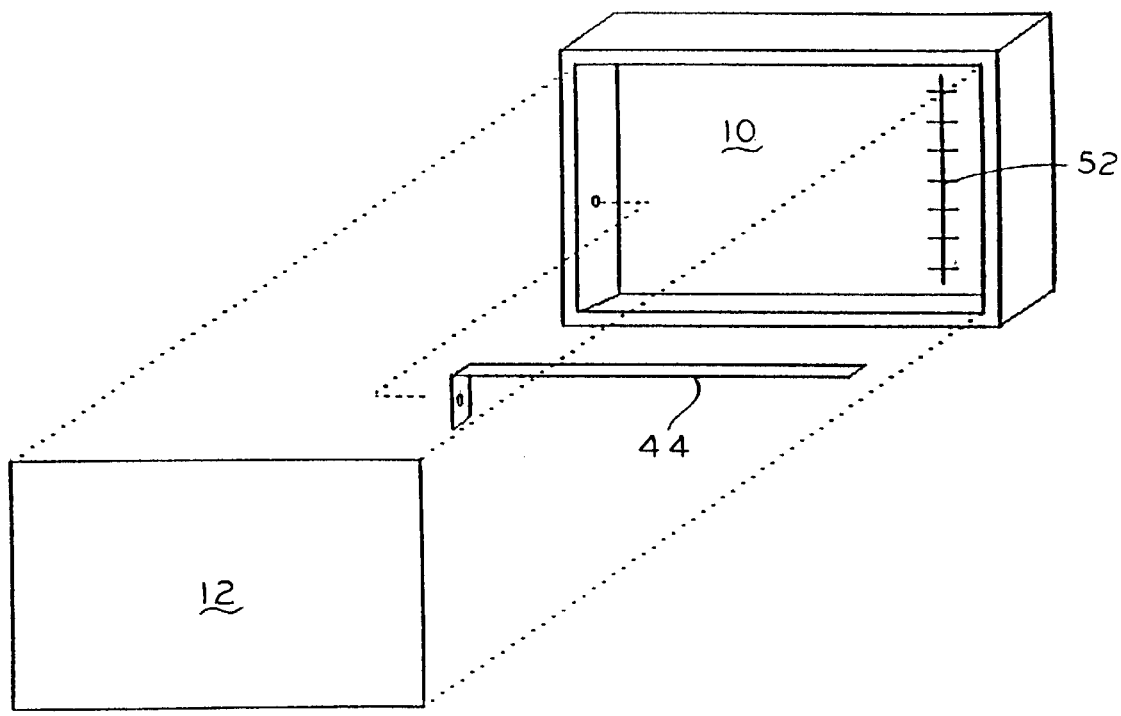
FIG.4Ad

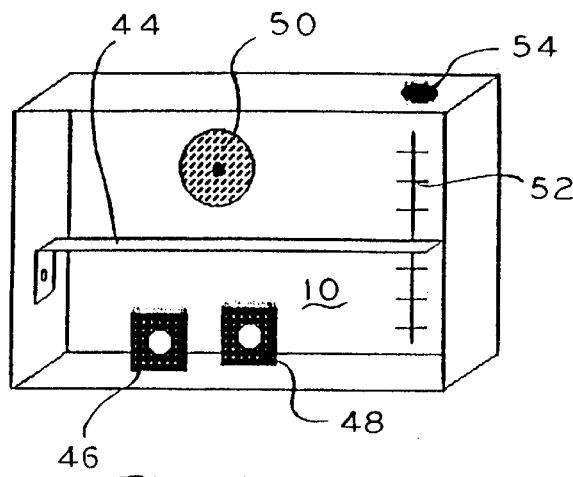
FIG. 4Ba
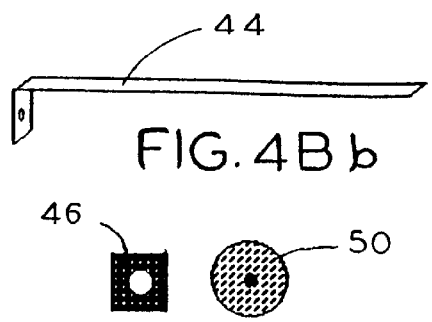
FIG. 4Bb
FIG. 4Bc
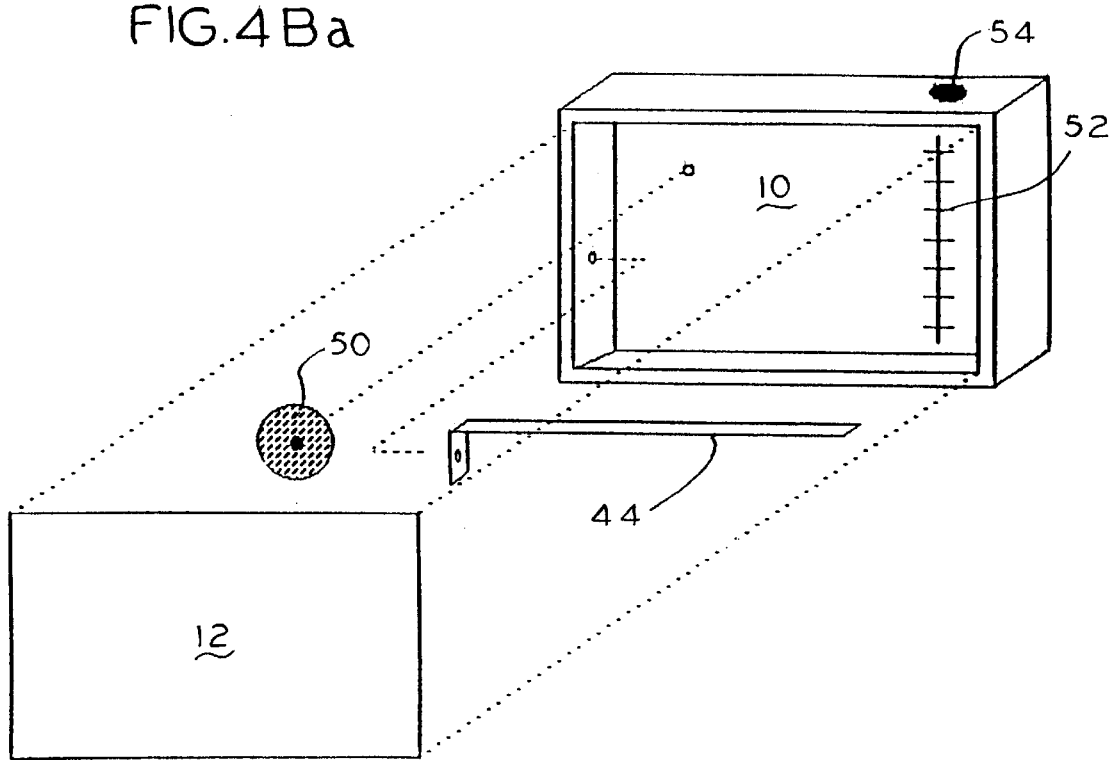
FIG. 4Bd

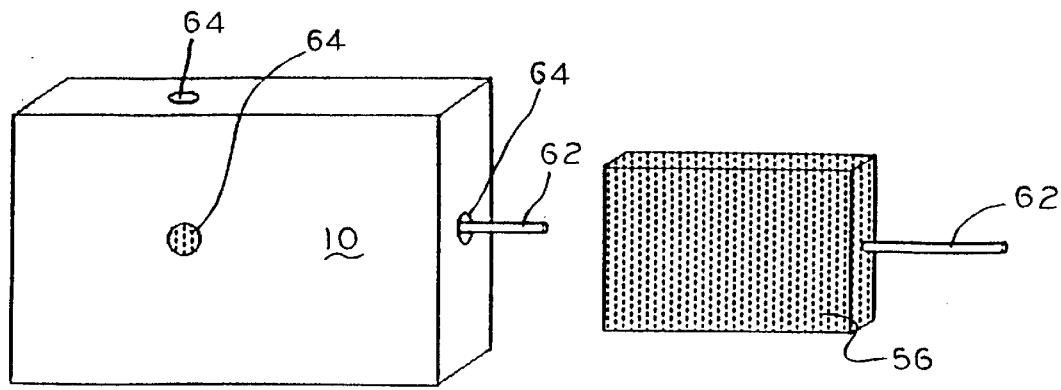
FIG.5Aa  FIG.5Ab
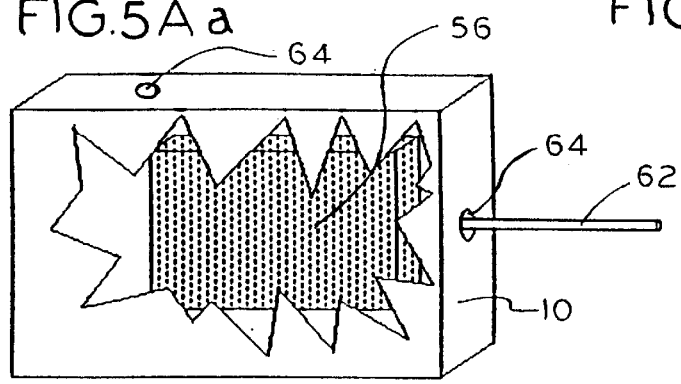
FIG.5Ac
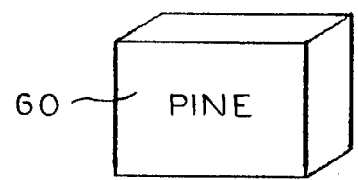
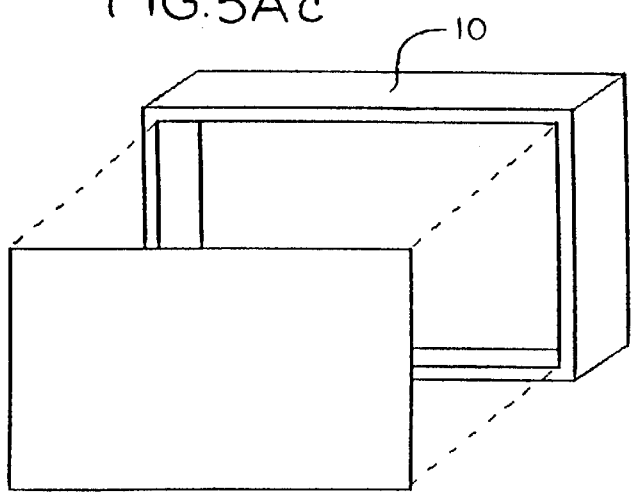
FIG.5Ad
FIG.5Ae

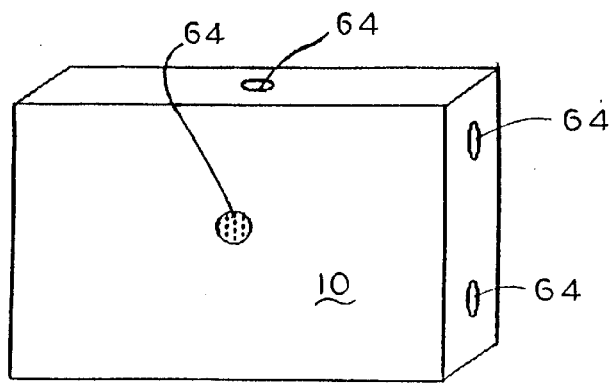
FIG.5Ba
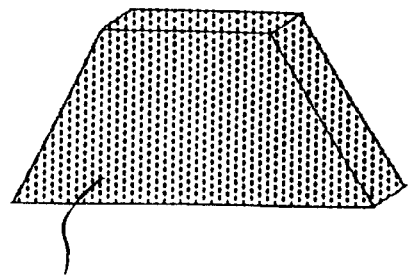
FIG.5Bb
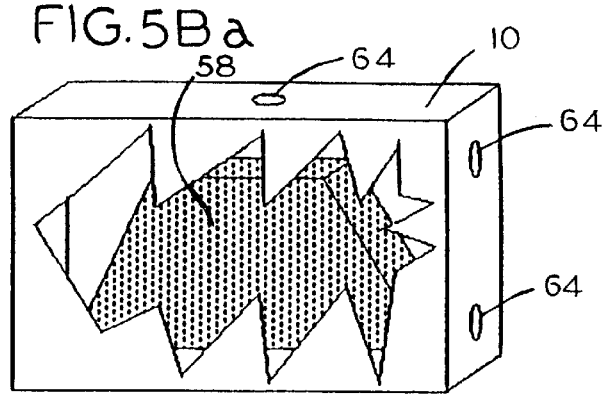
FIG.5Bc
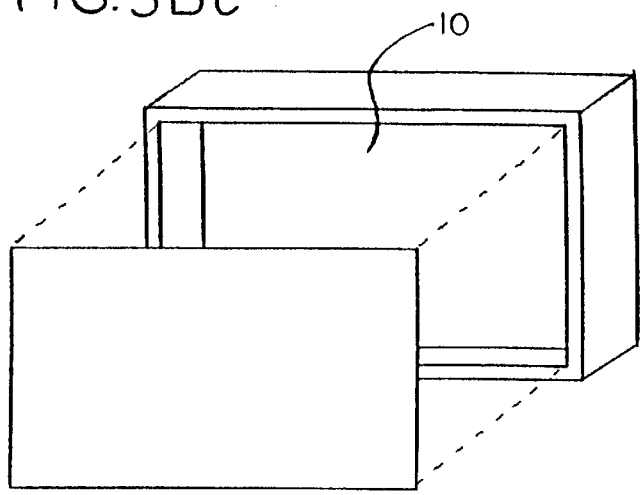
FIG.5Bd
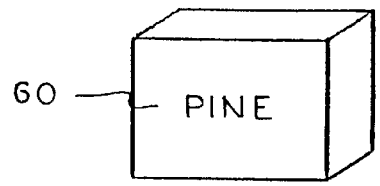
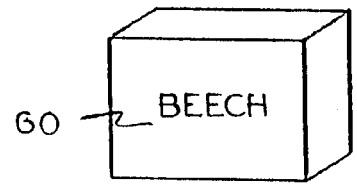
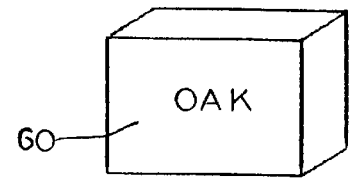
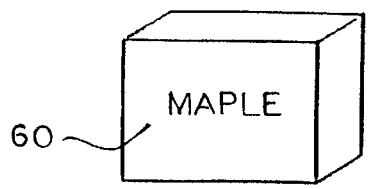
FIG.5Be

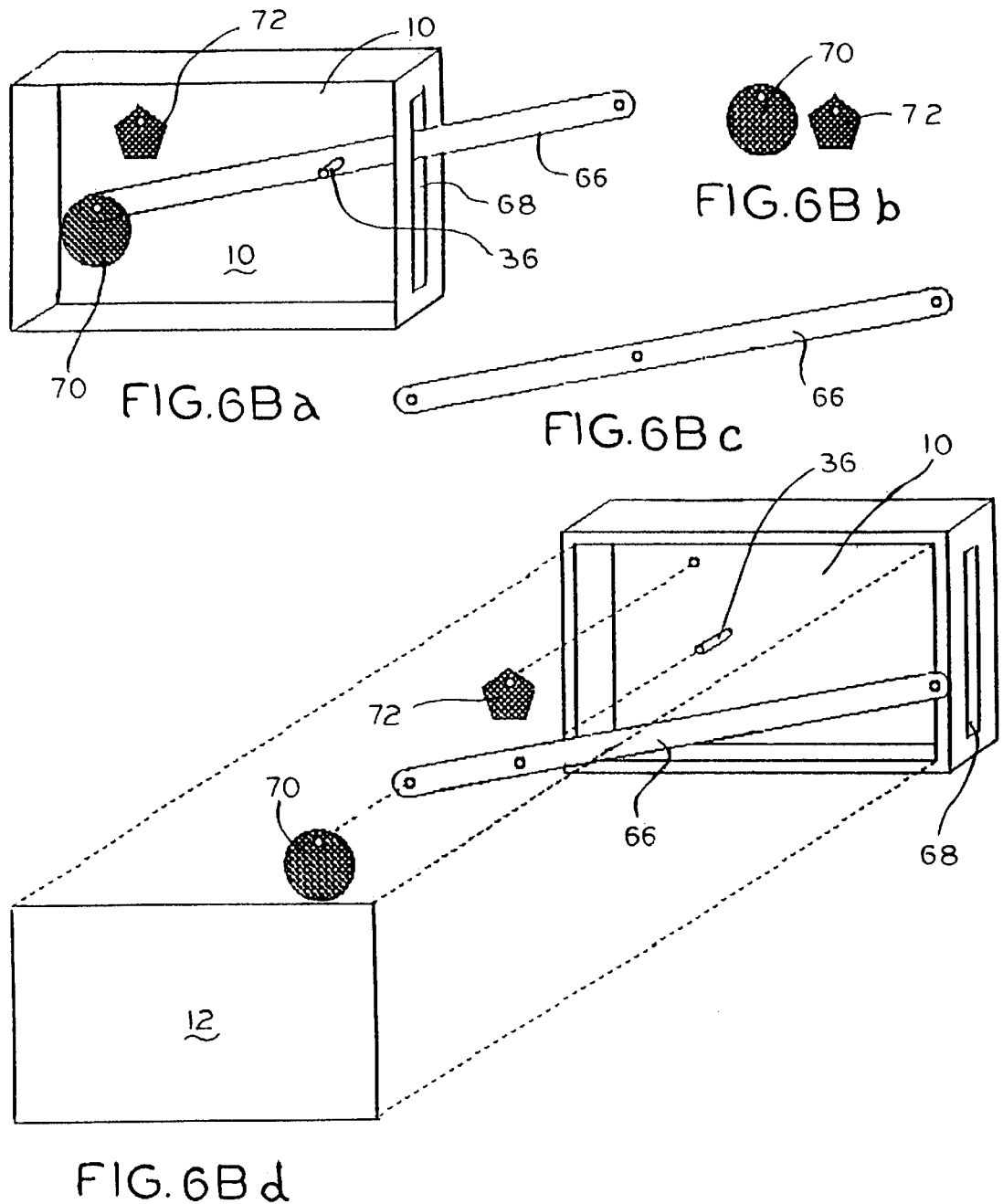

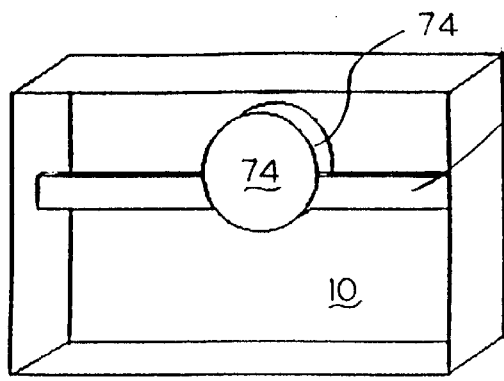
FIG. 7A a
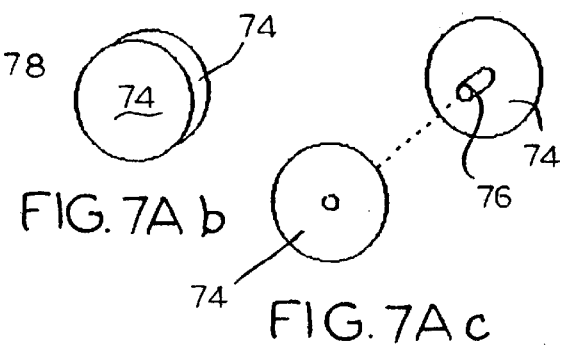
FIG. 7A b
FIG. 7A c
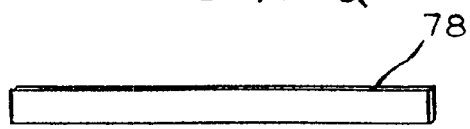
FIG. 7A d
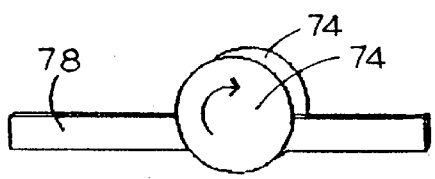
FIG. 7A e
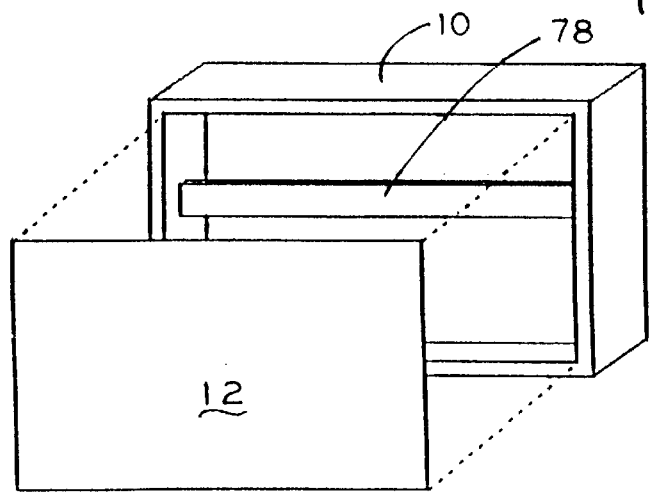
FIG. 7A f

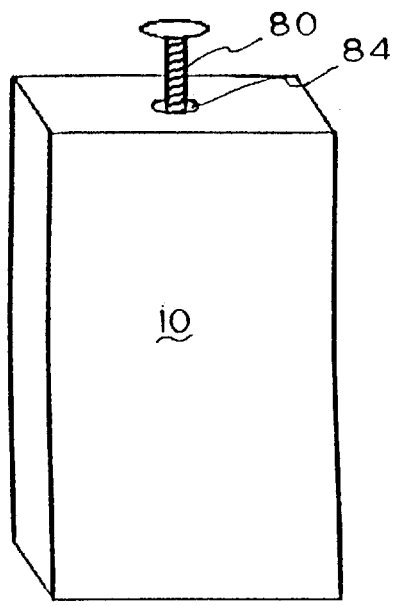
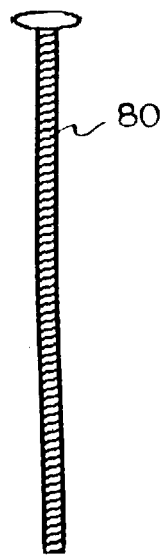
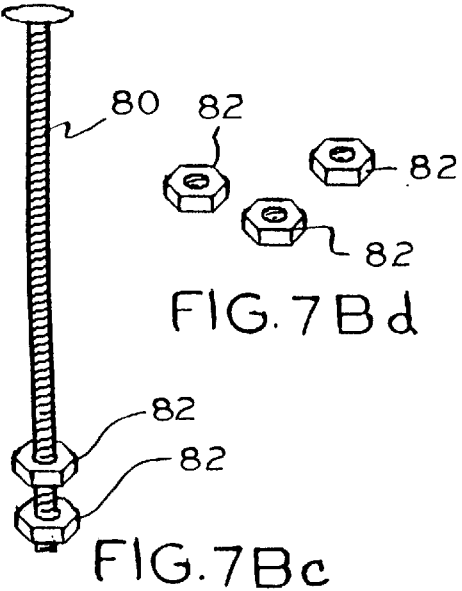
FIG.7Ba  FIG.7Bb  FIG.7Bc  FIG.7Bd
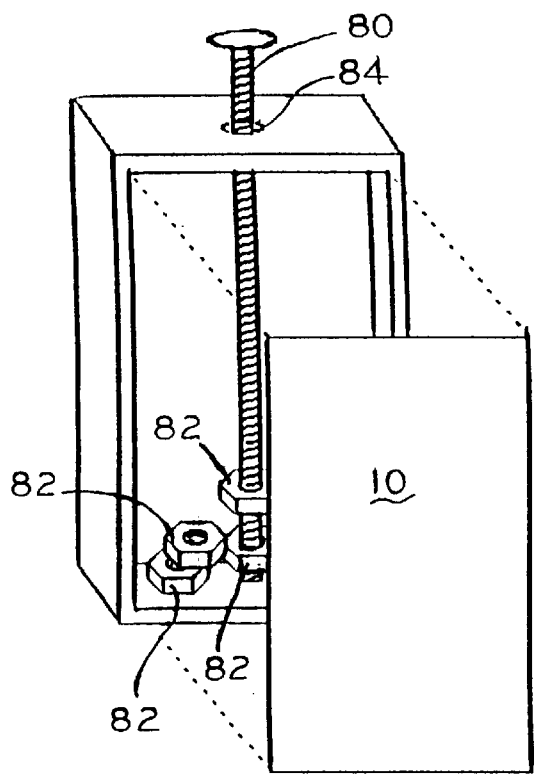
FIG.7Be

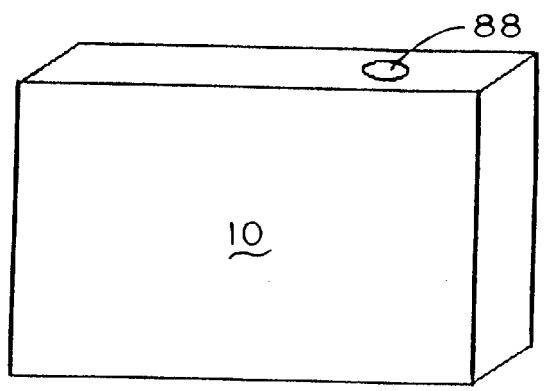
FIG. 7C a
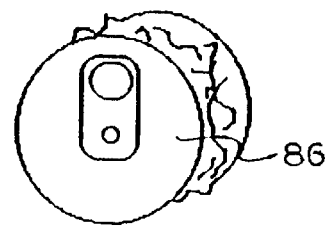
FIG 7C b
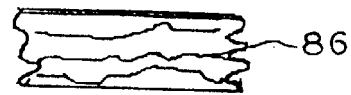
FIG. 7C c
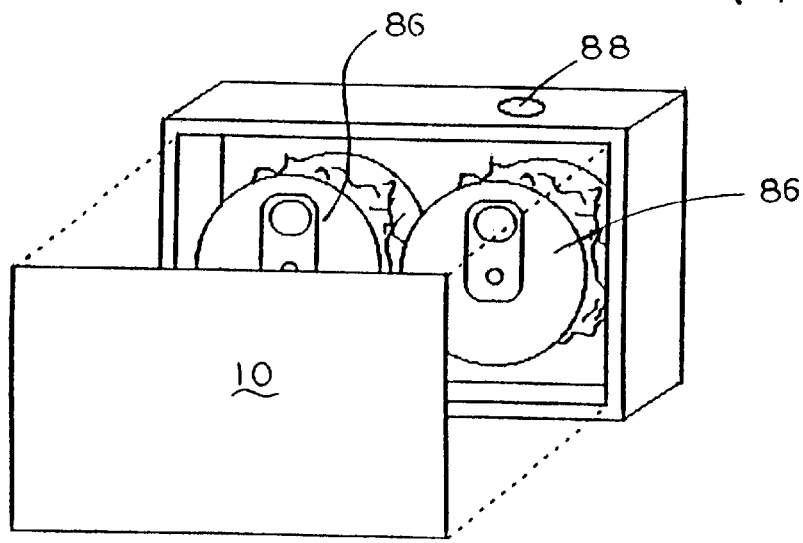
FIG 7C d

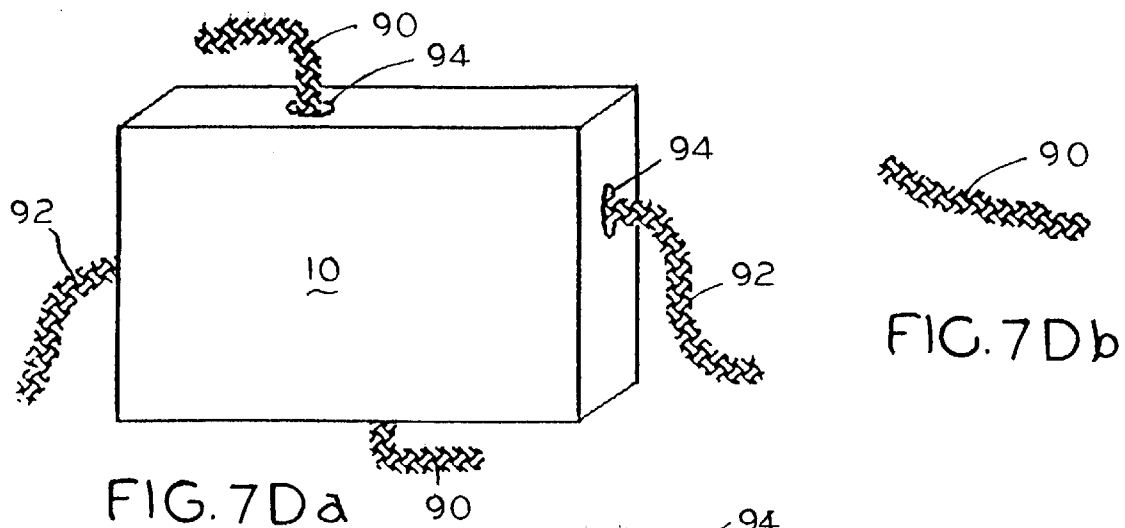
FIG. 7Da
FIG. 7Db
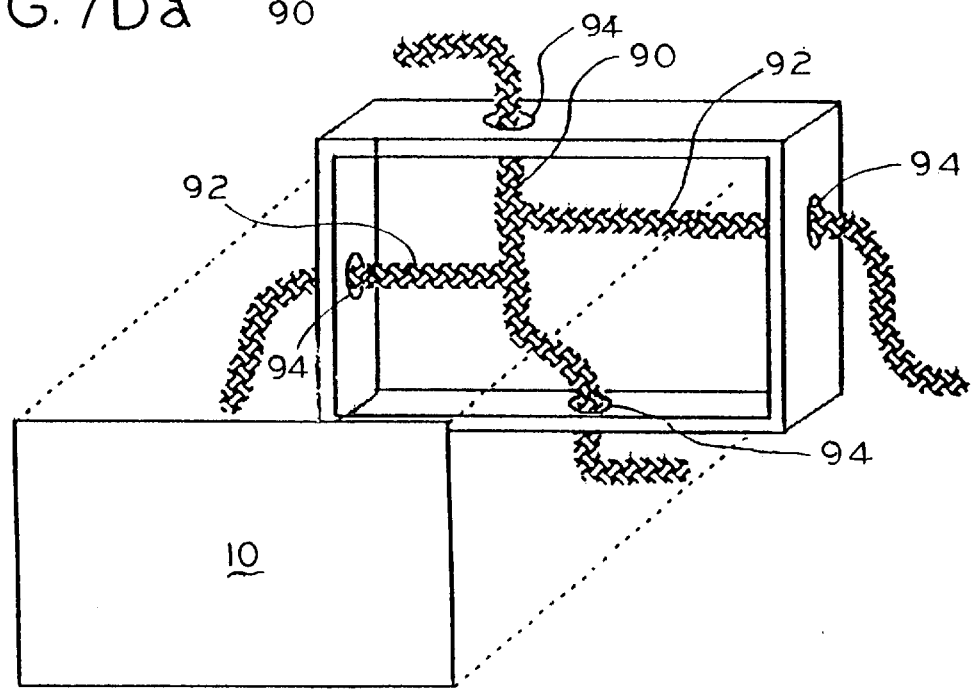
FIG. 7Dc

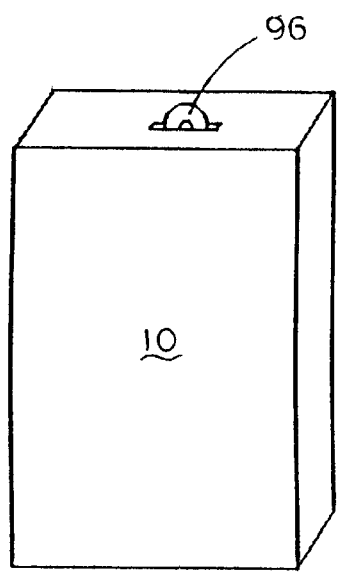
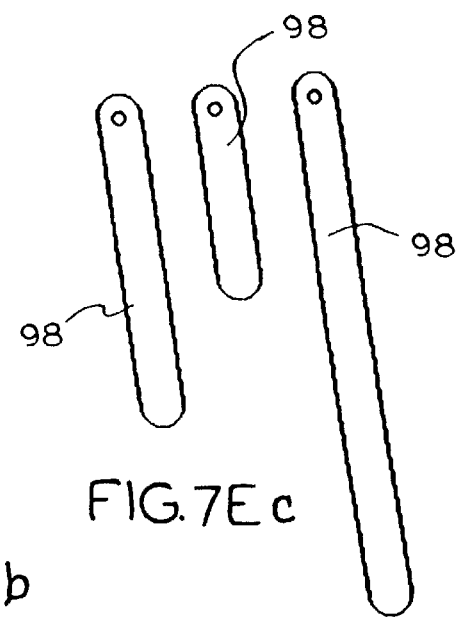
FIG. 7E b
FIG. 7E c
FIG. 7E a
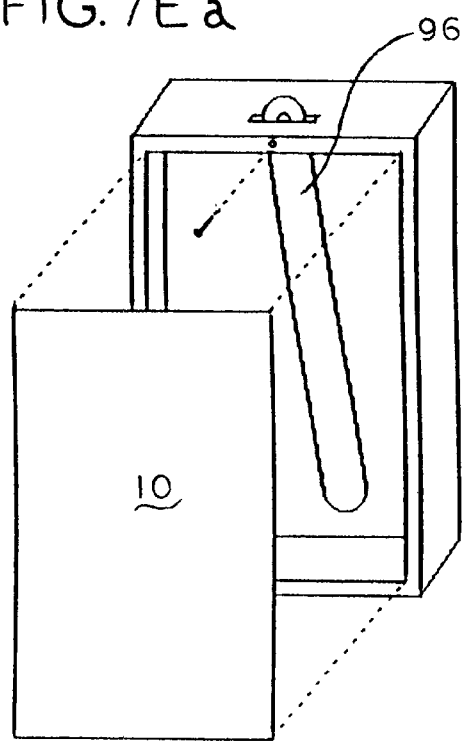
FIG. 7E d

APPARATUSES AND KITS FOR TEACHING MATHEMATICS

This application claims priority to Provisional Application Ser. No. 60/007,634 filed on Nov. 28, 1995 entitled "Method and Apparatus For Teaching Mathematics".

FIELD OF THE INVENTION

The invention pertains to mathematics education and, more particularly, to an educational apparatus, a mathematics education kit and a method of teaching mathematical problem solving.

BACKGROUND OF THE INVENTION

The field of mathematics education is undergoing radical changes. Mathematics has been traditionally taught in a manner where the teacher tells the students exactly what to do and then the students do it. This leads to a narrow understanding of the field of mathematics as well as its applicability in the real world. The traditional method is easier for the teacher, since it is typified by one-step, rote processes that are easy to teach and easy to grade. This situation is referred to as a "teacher centered classroom". This traditional method is often implemented by the use of worksheets containing repetitive, one-step arithmetic problems.

The result of traditional teaching has been dismal as far as preparing students for real world situations where mathematics is used. The United States has continually seen falling SAT scores, low ranking in mathematics ability among industrialized nations, and complaints among employers that graduates from the nation's schools are mathematically illiterate.

In 1989, the NCTM (National Council of Teachers of Mathematics) issued a set of recommendations referred to as "The Standards", in which they advocated the teaching of mathematics in a way that reflects problem solving in the real world, especially that problem solving which meets the following criteria: hands-on investigation, estimation, reasoning, experimentation, multiple solution steps, variable methods, and group work. Additional criteria require the demonstration of a student's ability to communicate mathematically via charts, graphs, diagrams, discussions, and writings. Current state and federal guidelines for the teaching of mathematics have incorporated most of these NCTM recommendations into their own directives.

Specifically, the NCTM recommends questions that demand reasoning in order to get an answer; methods that encourage group work, trial-and-error, and discussion; and answers that contain an explanation rather than a single number. The NCTM wants to get away from rote memorization of rules and teaching by telling, and move on to investigating questions from problem situations and connecting mathematics to other subjects and to the world outside the classroom.

One of the difficulties of the NCTM recommendations is the required culture shift in the teaching of mathematics. Generations of teachers have grown up in the classroom culture where the teacher tells the student what to do, mathematics is all done in one (or two) rote steps, and there is little connection to the outside world. Teachers growing up in this environment are not comfortable with experimenting, estimating, and reasoning. Quite frankly, mathematics is typically their least favorite subject and is done as quickly as possible. A major flaw in the NCTM recommendations is that no vehicle was supplied to meet these standards. Teachers can buy dice, rulers, geometric shapes, marbles, little sticks, and a multitude of other manipulatives to work with. Many teachers are at a loss as to what to do with these manipulatives, due to a lack of basic mathematics training. On visiting an elementary classroom, one often sees children using these manipulatives to build houses or to play with in some other inappropriate way.

SUMMARY OF THE PRESENT INVENTION

The objects of the present invention are achieved by providing an educational apparatus which includes a substantially closed vessel with at least one item contained within the vessel. Each item within the vessel is selected from a group of various types of predetermined items. A mechanism for obtaining information relevant to the items contained within the closed vessel is provided.

The present invention additionally provides a mathematics education kit which includes at least one substantially closed primary vessel and a substantially closed reference vessel, with the reference vessel being substantially identical to the primary vessel. At least one item is contained within the primary vessel, with each item selected from a group of various types of predetermined items. The kit also includes a measuring mechanism for measuring the vessels and the items.

One embodiment of the kit of the present invention includes reference items for each of the various types of predetermined items, with each reference item being substantially identical to the corresponding type of predetermined item. Additionally, the measuring mechanism may include a mass scale.

The present invention additionally provides a method for teaching mathematics comprising the steps of providing the student with a mathematics education kit according to the present invention as described above, posing a question relating to the items contained within the primary vessel, and encouraging the students to find an answer to the question using the kit provided.

The present invention contemplates providing a series of kits. Additionally, a preferred embodiment of the present invention provides that the question relating to the items within the primary vessel is present directly on the primary vessel.

These and other objects of the present invention will be clarified in the description of the preferred embodiments taken together with the attached figures wherein like reference numerals represent like elements throughout.

BRIEF DESCRIPTION OF THE DRAWINGS

FIGS. 1A–a to 1A–d illustrate a mathematics education kit according to a first embodiment of the present invention;

FIGS. 1B–a to 1B–d illustrate a mathematics education kit according to a second embodiment of the present invention;

FIGS. 2A–a to 2A–e illustrate a mathematics education kit according to a third embodiment of the present invention;

FIGS. 2B–a to 2B–d illustrate a mathematics education kit according to a fourth embodiment of the present invention;

FIGS. 3A–a to 3A–d illustrate a mathematics education kit according to a fifth embodiment of the present invention;

FIGS. 3B–a to 3B–e illustrate a mathematics education kit according to a sixth embodiment of the present invention;

FIGS. 4A–a to 4A–d illustrate a mathematics education kit according to a seventh embodiment of the present invention;

FIGS. 4B–a to 4B–d illustrate a mathematics education kit according to an eighth embodiment of the present invention;

FIGS. 5A–a to 5A–e illustrate a mathematics education kit according to a ninth embodiment of the present invention;

FIGS. 5B–a to 5B–e illustrate a mathematics education kit according to a tenth embodiment of the present invention;

FIGS. 6A–a to 6A–d illustrate a mathematics education kit according to an eleventh embodiment of the present invention;

FIGS. 6B–a to 6B–d illustrate a mathematics education kit according to a twelfth embodiment of the present invention;

FIGS. 7A–a to 7A–f illustrate a mathematics education kit according to a thirteenth embodiment of the present invention;

FIGS. 7B–a to 7B–e illustrate a mathematics education kit according to a fourteenth embodiment of the present invention;

FIGS. 7C–a to 7C–d illustrate a mathematics education kit according to a fifteenth embodiment of the present invention;

FIGS. 7D–a to 7D–c illustrate a mathematics education kit according to a sixteenth embodiment of the present invention; and FIGS. 7E–a to 7E–d illustrate a mathematics education kit according to a seventeenth embodiment of the present invention.

DESCRIPTION OF THE PREFERRED EMBODIMENTS

Figure 3A:
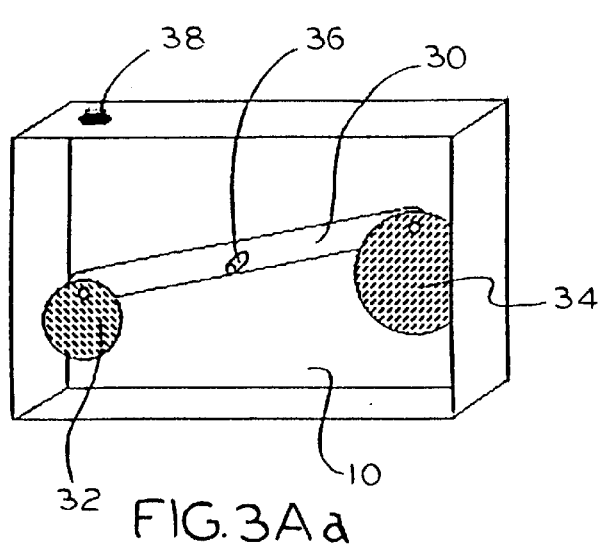
Figure 3A:
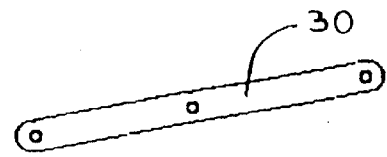
Figure 3A:
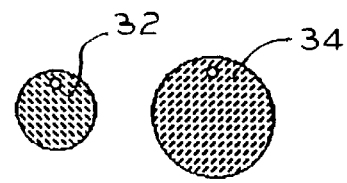
Figure 3A:
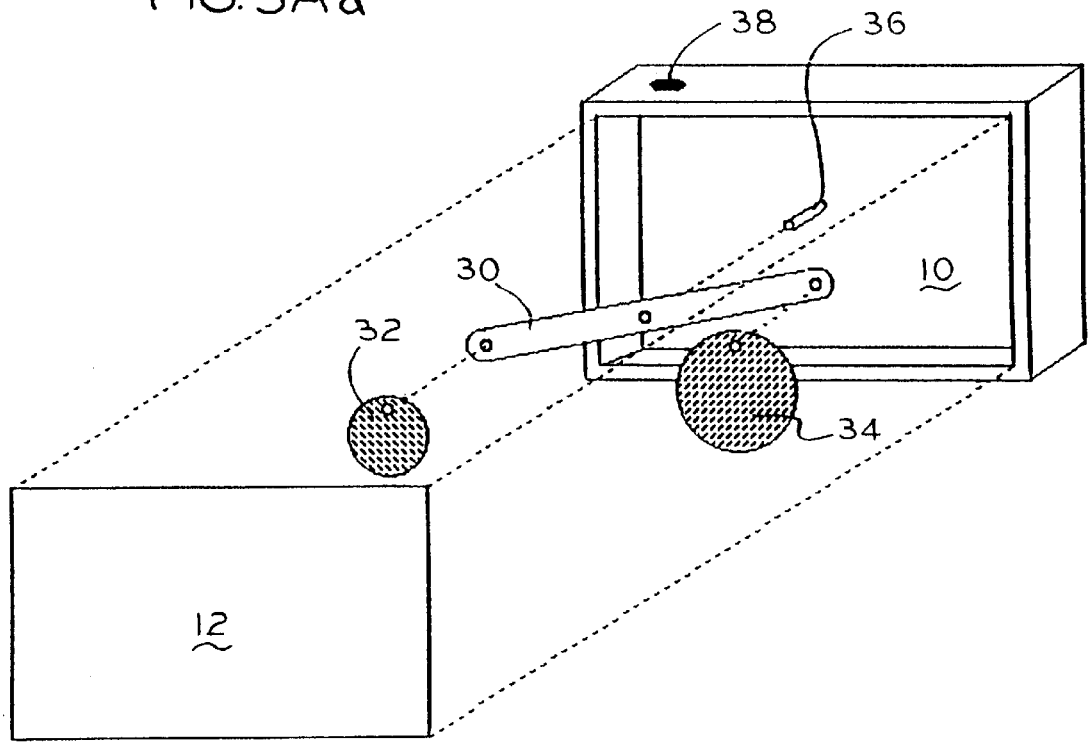

In order to meet this need, I have developed a method and apparatus for teaching problem solving in mathematics which stimulates natural curiosity through canonical questions involving one or more in a series of substantially sealed containers. A student is given a container together with appropriate tools and materials and asked to investigate the question. The student is not told what to do, but instead encouraged to use trial–and–error, estimation, and varied methods to solve the problem. This is opposed to the one–step, single answer methods used in present day mathematics education.

The series of containers of the present invention have been created and designed specifically to conform to the NCTM recommendations. The series provides canonical problems in a container that inherently meet the NCTM standards, since the problems cannot be solved without meeting the standards. In fact, the containers of the present invention are the first and only educational product on the market to meet each and every NCTM specification. Each container presents a unique mathematical problem which cannot be solved without engaging the new guidelines.

Each container consists of a generally sealed and generally opaque container that can be shaped like a 4×6×1 inch rectangular box containing items whose attributes, such as quantity, length, weight, color, type or value, are to be determined using mathematical problem solving methods as recommended by the NCTM in their 1989 document known as "The Standards". In some cases, one face of the container is transparent but sealed, so as to allow direct visual observation of the contents. In some cases, there is an opening, such as a slot or holes, in one or more of the faces, allowing limited tactile or visual contact with the contents. The items may be wholly contained in the container or may extend out of the container. In some cases the items contained in the container are loose, while in some cases the items contained are attached to interior faces, to levers, balance beams or springs whose movement can be effected and/or measured through either the transparent face or openings of the container. It is intended that the design will reveal enough of the contents to clarify the problem, yet conceal the contents sufficiently so that the student needs to use mathematical principles rather than just physical manipulation of the contents in order to answer the question posed. Each container requires an indirect measurement to solve the problem. For example, one might determine how many links are on a chain by weighing the chain and weighing one link, then dividing these numbers. One cannot directly count the number of links on the chain since most of the chain cannot be seen.

Each container has a problem or problems associated with it. A kit is provided with each container which will allow solution or solutions to each problem. A kit normally consists of a scale with a range of 0 grams to 500 grams, extra reference items as contained in the container, and a duplicate but empty reference container. In some cases a kit will contain a ruler, levers, or other items deemed necessary for the solution of the problem. Each kit has a teacher's manual explaining how to use the system comprised of the container and its associated kit.

A container in the present embodiment is preferably constructed of polystyrene plastic. The plastic has color added to make it opaque, however, if there is a transparent face, the plastic in that face has no color added.

As described above, the present invention includes a method for teaching problem solving in mathematics which is inextricably involved with a series of containers. It is based on student–led investigation rather than teacher–led rote procedures. As such, it is recommended that the teacher group the students into groups of two to four students. The teacher should present the container, the associated kit, and the problem to the student group. At this point, the teacher should take a passive role and allow the students to investigate the problem. The teacher should not tell the students exactly what to do. The teacher should provide encouragement and supply information only when it appears critical. Good information to give is "write your results on paper as you work" or "each person in the group should secretly weigh the container". Bad information to give is "first weigh the full container, then weigh the empty container, then subtract the two numbers". The teacher may listen and encourage, but should refrain from telling them exactly what to do. The preceding activity takes place in a single hour session.

It normally happens that data will be collected during the first period of investigation. The student group should talk among themselves about how to proceed with the solution of the problem. Class discussion might involve such topics as: "Is weighing a single marble better than weighing 10 marbles when determining the weight of a single marble" or "How could we get a better value for the weight of the empty container". A second period of investigation is often requested by the students and should be provided.

The students should write up the story of their investigation in a format appropriate to their writing level. This written report should include (1) statement of the problem, (2) methods used including diagrams as necessary, (3) data section, preferably given in chart or graph form, (4) calculations with discussion, and (5) conclusion. The final activity is preferably a class discussion of the written reports, during which time methods of displaying data using graphs and other pertinent topics could be further discussed.

The container 10 described in each of the following embodiments is 4×6×1 inches and made of opaque plastic, sometimes having a transparent 4×6 inch face 12 shown in FIGS. 3A–d, 3B–e, 4A–d, 4B–d, 6A–d, 6B–d, and 7A–f. Each problem presented may be accompanied by a kit which contains a duplicate empty reference container 10 to the container 10 under discussion as well as weighing scales. The kit also contains duplicates of appropriate items in the container 10 as will be discussed.

Two examples are given with each group; however, as many possible embodiments may be made of the invention without departing from the scope thereof, it is to be understood that all matter herein set forth or shown in the accompanying drawings is to be interpreted as illustrative and not in a limiting sense.

Group #1, referred to as The Marble Containers, is shown in FIGS. 1A–a to 1A–d and 1B–a to 1B–d. Each vessel or container 10 in Group #1 contains a multitude of loose marbles (14, 16 and 18) and/or other loose objects of various quantities, sizes and colors. Each container 10 in this group has a 3/16×2 inch slit or opening 20 in one of the 1.5×4 inch faces. Otherwise the container 10 is totally sealed and opaque. The kit provided with each container 10 from this group contains duplicate marbles 14, 16 and 18 (see FIGS. 1A–d and 1B–d) as contained in each container 10, a scale (not shown), and a duplicate empty container as shown in FIGS. 1A–c and 1B–c.

The first member of this group, shown in FIGS. 1A–a to 1A–d, contains a multitude of monochromatic 14 mm marbles 14 and 16 in each of two colors. There is a quantity of each of those colors. FIG. 1A–a shows the container 10 as seen by the student, FIG. 1A–b shows a break–away view exposing some of the contents, FIG. 1A–c is the duplicate empty container 10 (shown with the lid removed) provided to the student and FIG. 1A–d shows the duplicate marbles 14 and 16 provided to the student.

The two problems presented to the student with the container 10 of FIG. 1A–a are (1) determine the total number of marbles 14 and 16 in the container 10, and (2) determine the number of marbles 14 and 16, respectively, of each of the colors.

In this and all of the following embodiments, the desired solution is to be discovered and explained by the student. It is intended that the student be given sufficient time and materials to explore and find a solution. The teacher should refrain from telling the student what to do, unless it is absolutely necessary. Even then, only enough information should be given to allow the student to continue. What follows in this and each embodiment is one or more methods that we expect the student will discover to solve the problem.

The canonical solution to finding the number N of marbles 14 and 16 in container 10 of FIG. 1A–a is to (a) weigh the container 10 of FIG. 1A–a, then (b) weigh the empty container 10 of FIG. 1A–c which is provided. The difference of these weights gives the total weight T of the marbles 14 and 16 inside, next (c) determine the weight w of a single marble 14 or 16 by weighing six marbles 14 and 16 shown in FIG. 1A–d provided with the kit and taking the average. Next, (d) calculate N={T/w} by dividing the total marble weight inside the container 10 of FIG. 1A–a by the weight of a single marble, then choosing the closest integer to T/w.

An alternate method of solution is to (a) weigh the container 10 of FIG. 1A–a, then (b) place the duplicate but empty container 10 of FIG. 1A–c on the scale and add marbles 14 or 16 until the weight showing on the scale is closest to that of the full container 10 of FIG. 1A–a. The number of added marbles 14 or 16 is equal to the number of marbles 14 and 16 in the container 10 of FIG. 1A–a.

To determine the number of marbles 14 and 16, respectively, of each color, the student will observe the marbles visible through the slit. Although only a few of the marbles 14 and/or 16 are visible, their average color ratio will reflect the color ratio in the container 10. Students should shake the container 10 and observe the marbles 14 and/or 16 visible in the window or opening 20 about twenty times in order to determine the average color ratio. Since the total number of marbles 14 and 16 in the container 10 has been determined, the number of each color can be determined. More specifically, if the color ratio viewed in the opening 20 is 2:3, and there are twenty marbles 14 and 16 in the container 10, then there are 20*2/(2+3)=8 marbles 14 of the first color and hence 20−8=12 marbles 16 of the second color.

The second member of this group, container 10 shown in FIG. 1B–a, contains a multitude of 14 mm marbles 14 and a multitude of 10 mm marbles 18. All marbles 14 and 18 in this container 10 may be the same color. The total number of marbles 14 and 18 is fixed and given to the student.

The problem presented to the students in the container 10 of FIG. 1B–a is to determine the number n of 14 mm marbles 14 and the number N of 10 mm marbles 18 in the container 10 of FIG. 1B–a.

An elementary solution to this problem is to utilize a table constructed by the student. The steps are as follows: (1) weigh the full or primary container 10 shown in FIG. 1B–a, (2) weigh the empty duplicate or reference container 10 shown in FIG. 1B–c, (3) subtract the two weights, giving the total weight T of marbles 14 and 18, (4) from samples of marbles 14 and 18 provided as shown in FIG. 1B–d, determine the weight w of a single 14 mm marble 14, (5) determine the weight w of a 10 mm marble 18, (6) construct a table in the following manner (for the purposes of illustration, I assume the total number of marbles 14 and 18 in the container 10 of FIG. 1B–a is twenty, the total weight of marbles 14 and 18 is 85 grams, the weight of a 14 mm marble 14 is 5 grams, and the weight of a 10 mm marble 18 is 2 grams):

Below is a table listing weights of various combinations of marbles 14 and 18:

| Number of 14 mm marbles 14 | Number of 10 mm marbles 18 | Total weight of marbles |
| --- | --- | --- |
| 1 | 19 | 43 |
| 2 | 18 | 46 |
| 3 | 17 | 49 |
| ... | | |
| 15 | 5 | 85 |
| ... | | |
| 19 | 1 | 97 |

(7) the student will compare the weights on the last column of the table with the actual weight of marbles 14 and 18 in the container 10 of FIG. 1B–a and see that there are fifteen of the larger marbles 14, and five of the smaller marbles 18.

A second method is to duplicate steps (1) through (5) above and then (6) construct an equation for the total weight of marbles 14 and 18 in the container 10 of FIG. 1B–a, i.e., 5n+2N=85, (7) replace n by 20−N in the equation given in (6) to give the equation 5(20−N)+2N=85, or 3N=15, and (8) solve the equation to get N=5 and thus n=15.

Group #2 is referred to as The Chain Containers and is illustrated in FIGS. 2A–a to 2A–e and 2B–a to 2B–e. Each container 10 in Group #2 is totally opaque and contains a chain 22 or chains 22 and 24, each partially extending out of the container 10. The kit provided with each container 10 from this group contains duplicate chain links of chains 22 and 24 as contained in each container 10 of FIGS. 2A–a and 2B–b, a scale, and a duplicate empty container 10.

The first member of this group, shown in FIG. 2A–a, contains a ⅜ inch coil chain 22 partially protruding from an opening 26 in the container 10. There is a quantity of links on this chain 22 within the closed container 10.

The two problems presented to the student by the container 10 of FIG. 2A–a are (1) determine the total number of links on the chain 22 in the container 10 and (2) determine the length of chain 22 in the container 10. The student is given a duplicate empty container as shown in FIG. 2A–d and duplicate or reference chain links of chain 22 which are shown in FIG. 2A–e.

The canonical solution to determine the total number of links on the chain in the container 10 is given in the following steps: (1) weigh container 10 of FIG. 2A–a which contains the chain 22 (shown individually in FIG. 2A–b), (2) weigh the duplicate empty container 10 as shown in FIG. 2A–d, (3) take the difference of these two weights, which is the weight C of the chain 22, (4) determine the weight w of a single link of chain 22 by weighing the sample pair of links shown in FIG. 2A–e and dividing by two, and (5) calculate the number of links of chain 22 by dividing C/w and rounding to the nearest integer.

To determine the length of chain 22 in the container 10 of FIG. 2A–a, one method is to construct a table in the following manner. (1) Measure the length of one link of chain 22. (2) Measure the length of two links of chain 22 if they are interlinked. (3) Continue this until the number of links in the chain 22 is reached. The table looks like:

| Number of links | Length of chain |
|---|---|
| 1 | 1.3 |
| 2 | 2.3 |
| 3 | 3.3 |
| ... | |
| ... | |
| 8 | 8.3 |

It is the intent that the student will observe a pattern during the construction of this table and only a few measurements will actually be carried out. Look up the number of links in the left column and the length of the chain 22 is in the right column.

The second member of this group, the container 10 shown in FIG. 2B–a, contains a ⅜ inch coil chain 22 and a ⅛ inch coil chain 24 each partially protruding from the container 10 through openings 26 and 28, respectively. The connected chains 22 and 24 are shown separately in FIG. 2B–b. There is a quantity of links on each of the chains 22 and 24 and the chains 22 and 24 are joined into one connected chain as shown in FIGS. 2B–b and 2B–c. The total number of links of the combined chain 22 and 24 is fixed and given to the student.

The two problems presented to the student with the container 10 of FIG. 2B–a are (1) determine the total number of links of each individual chain 22 and 24 on the combined chain in the container 10 and (2) determine the total length of the combined chain in the container 10.

An elementary solution of this problem involves the making of a table. The steps are (1) weigh container 10 of FIG. 2B–a with the two chains 22 and 24, (2) weigh the empty duplicate container 10 shown in FIG. 2B–d, (3) calculate the total weight C of the combined chain in the container 10 of FIG. 2B–a by subtracting these two numbers, (4) determine the weight W of one link of ⅜ inch coil chain 22 shown in FIG. 2B–f, (5) determine the weight w of one link of ¼ inch coil chain 24 shown in FIG. 2B–e, and (6) construct a table in the following format (for the purpose of this illustration, I am assuming a ⅜ inch chain link of chain 22 weighs 17 grams, a link of ⅛ coil chain 24 weighs 12 grams, the total number of links is given to be 15, and the total weight of the combined chain in the container 10 is 200 grams):

| Number of ⅛ inch chain links | Number of ⅜ inch chain links | Total weight of combined chain |
|---|---|---|
| 1 | 14 | 250 |
| 2 | 13 | 245 |
| 3 | 12 | 240 |
| ... | | |
| ... | | |
| 9 | 6 | 210 |
| 10 | 5 | 200 |
| 11 | 4 | 190 |
| ... | | |

The student will observe that if the total weight C is nearest 200, then there must be ten of the ⅛ inch links of chain 24 and five of the ⅜ inch links of chain 22.

The calculation of length of the combined chain is similar to that in the container 10 of FIG. 2A–a discussed above.

Group #3 is referred to as The Balance Beam Container and is shown in FIGS. 3A–a to 3A–d and 3B–a to 3B–d. Each container 10 in Group #3 contains a balance beam 30 with weights 32 and 34 attached to either end of the balance beam 30. The balance beam 30 is made of plastic and rotates on a pivot pin 36 which goes through the balance beam 30. The pivot pin 36 is permanently attached to the inside wall of the container 10. The weights 32 and 34, normally consisting of metal, are typified by washers, nuts, or fishing weights, and are attached to the balance beam 30 by rivets or small bolts. The container 10 has a transparent face 12 so the student can observe the entire contents of the container 10.

The kit provided with each container from this group contains a duplicate balance beam 30 (shown in FIGS. 3A–b and 3B–a), a ruler and scale (not shown), and a duplicate empty container 10. Duplicates to the weights 32 and 34 on the balance beam 30 are not provided in the kit. The kit further contains a tutorial in pamphlet form on balance beams.

In the first member of this group, the container 10 shown in FIGS. 3A–a to 3A–d, the pivot pin 36 in the balance beam 30 is in the center of the balance beam 30 and the weights 32 and 34 are different. There is a ⅜ inch hole or opening 38 in the top face of the container, directly above the lighter weight 32.

The problem presented to the student in the container 10 shown in FIG. 3A–a is to determine the weight of each weight 32 and 34 on the balance beam 30.

The following steps will solve this problem. (1) Weigh the container 10 of FIG. 3A–a, (2) weigh the empty duplicate container 10 together with balance beam 30 of FIG. 3A–b, then (3) take the difference of these two weighings, giving the sum S of the two weights 32 and 34 in the container 10 of FIG. 3A–a, (4) again put the container 10 of FIG. 3A–a on the scale and, using a pencil or pen passing vertically down through the ⅜ inch opening 38, push down on the lighter weight 32 to cause the balance beam 30 to level. Read the scale at this time. (5) Subtract from this number the total weight of container 10 of FIG. 3A–a as determined above. This is the number of grams required to balance the beam 30, and thus is the difference D between the mass of the weights 32 and 34 on the balance beam 30. (6) The mass of the small weight is (S−D)/2 and the mass of the large weight is (S+D)/2.

In the second member of this group, the container 10 shown in FIG. 3B–a, again the pivot pin 36 is in the center of the balance beam 30 and the weights 32 and 34 are different. A rod 40 attached to the balance beam 30 protrudes from the top of the container 10 through opening 42. The rod 40 and the two weights 32 and 34 are attached at different points on the beam.

The problem presented to the student in the container 10 of FIG. 3B–a is to determine the amount or mass of each weight 32 and 34 on the balance beam 30.

The following steps will solve this problem. (1) Find the weight W1 of the container 10 of FIG. 3B–a, (2) find the weight W0 of the empty duplicate container 10 together with duplicate rod 40 shown in FIG. 3B–c and duplicate balance beam 30 shown in FIG. 3B–b, then (3) take the difference of these two weighings, W1−W0, giving the sum S of the two weights 32 and 34 in container 10 of FIG. 3B–a. (4) Again put the container 10 of FIG. 3B–a on the scale and pull upward on the protruding rod 40 sufficiently to cause the balance beam 30 to level. Read the scale at this time, calling this weight W2. (5) Subtract from this number the weight W1 of container 10 determined above. W3=W1−W2 is the number of grams of pulling on the rod 40 required to balance the beam 30. (6) Let the small weight 32 have weight M1 and the other weight 34 have weight M2. Calling the distance from the small weight 32 to the pivot pin 36 d, the distance from the large weight 34 to the pivot pin 36 D, and the distance from the rod 40 to the pivot pin 36 R, we have d*M1=D*M2−R*W3. Combining this with the sum of the weights S=M1+M2 yields M1=[D*S−R*W3]/(d+D).

Group #4 is referred to as The Leaf Spring Containers. Each container 10 in Group #4 is sealed and has a transparent front face 12 through which the student can see the entire contents. Each container 10 contains a 3/8×0.015×6 inch flexible steel strip or spring 44 which has a ⅛ inch hole ⅜ inch from the end, and is bent at a 90° angle at a point ¾ inch from that end. The bent steel strip or spring 44 is attached to the 4 inch side of the container 10 with a ⅛ inch rivet in such a way as to divide the container 10 into two approximately equal spaces. There are items 46, 48 and 50 in the container 10, such as marbles or internally threaded iron nuts, whose weight is to be determined. There is a set of ruled lines forming a scale 52 on the inside 4×6 inch back face of the container 10, so that the amount of bending of the spring 44 can be observed and measured according to the number of ruled lines that are passed on the scale 52. The ruled lines of scale 52 are parallel to the length of the spring 44 and are at the end of the container 10 where the spring 44 is not attached.

The kit provided with each container 10 from this group contains a scale, a duplicate spring 44 shown in FIGS. 4A–b and 4B–b, and a duplicate container 10 without the items 46, 48 and 50 whose weight is to be determined. Each kit further contains information in text format pertaining to leaf spring behavior including Hook's Law.

The first member of this group, the container 10 shown in FIGS. 4A–a, is totally sealed and contains one internally threaded iron nut (items 46 and 48) on either side of the spring 44. The threaded nuts 46 and 48 are of different sizes.

The problem presented to the student with the container 10 of FIG. 4A–a is to determine the weight of each of the items 46 and 48 in the container 10 of FIG. 4A–a.

A solution for this problem is as follows: (1) Place the container 10 of FIG. 4A–a on the scale and observe the weight W1. (2) Place the empty duplicate container 10 together with the duplicate spring of FIG. 4A–d on the scale and observe the weight W0. The total weight of the two iron nuts 46 and 48 is W1−W0. (3) Tilt the container 10 of FIG. 4A–a so that the nut 46 in the top compartment slides to the unattached end of the spring 44 and observe the number of markings N1 on scale 52 through which the spring 44 moves during this time. (4) Turn the container 10 of FIG. 4A–a upside down with the loose nut 48 near the attached end of the spring 44 and observe the position of the spring 44. Then tilt the container 10 so the nut 48 slides to the free end of the spring 44 and observe the number of markings N2 of scale 52 that the spring 44 moves due to the weight of the nut 48. The nut 48 presently in the top half of the container 10 weighs (W1−W0) *N2/(N1+N2) and the loose nut 46 in the bottom weighs (W1−W0) *N1/(N1+N2).

The second member of this group, the container 10 of FIG. 4B–b, has a ⅜ inch hole or opening 54 in a 1½×6 inch side of the container 10, so that the touch of a pencil which passes through the opening 54 can cause the free end of the spring 44 to move. The container 10 of FIG. 4B–a contains two identical loose items 46 and 48, such as marbles or nuts, on the side of the spring 44 opposite the ⅜ inch external opening 54, as well as a similar but not identical item 50, which could be a washer, attached to a wall of the container 10.

The problem presented to the student with the container 10 of FIG. 4B–a is to determine the weight of each of the items 44, 46 and 50 in the container 10.

One method of solution is as follows. (1) Place the container 10 of FIG. 4B–a on the scale with the exterior opening 54 on top, then observe the weight W1. (2) Leaving the container 10 on the scale, put a pencil through the opening 54 and push on the spring 44 until the spring 44 flexes the distance D between two ruled lines of scale 52, then observe the weight on the scale W2. (3) Weigh the empty container 10 together with duplicate spring 44 and record the weight as W0. Then the sum of the weights 46, 48 and 50 in the container is W1−W0. (3) Turn the container upside down and move the items 46 and 48 to the free end of the spring 44 so that their weight causes the spring 44 to bend and observe the number of markings of scale 52 that the spring 44 has moved from rest. (4) Each loose weight is N(W2−W1)/2 and the attached weight is W1−W0−N(W2−W1).

Group #5 is referred to as The Mystery–Wood Containers. Each container 10 in Group #5 contains a piece of wood 56 or 58. The kit provided with each container 10 from this group contains samples 60 of different woods, each in rectangular form. A ruler, scale, and a duplicate empty container 10 are in the kit. Each kit further contains information in text format pertaining to volume and density.

The first member of this group, the container 10 of FIG. 5A–a, is opaque and contains an 8 cm×14 cm×1 cm rectangular block of wood 56 as shown in FIG. 5A–b which has a ⅛ inch dowel 62 protruding from the center of its 8 cm×1 cm face. The dowel 62 also protrudes through a 3/16 inch hole or opening 64 in a 4×1 end of the container 10. There is a ⅜ inch hole or opening 64 in each of the 6×1 faces as well as in each of the 4×6 faces of the container 10.

The problem presented with the container 10 of FIG. 5A–a is to determine the type of wood 56 in the container 10.

One method of solution is as follows. (1) Construct a table of densities of the woods provided by following the steps: for each sample 60 of wood provided (shown in FIG. 5A–e) outside of the container 10: (A) determine the height H, depth D and thickness T, (B) determine the weight W using the scale provided, and (C) calculate the density to be W/(H*D*T). Record the name of the wood sample 60 and the density of the wood sample 60 just calculated on one line.

| Wood | Density (g/cc) |
|---|---|
| Pine | 0.3 |
| Beech | 0.4 |
| Maple | 0.6 |
| Oak | 0.8 |

(2) Determine the weight W1 of container 10 of FIG. 5A–a and the weight W0 of the empty duplicate container 10 of FIG. 5A–d. (3) Measure the width D1 of the wood block inside the container 10 by inserting pencils into the opposing holes or openings 64 and observing how far the pencils penetrate these opposing holes or openings 64. Subtracting the sum of the penetrations from the width of container 10 gives the width of the block of wood 56. (4) Similarly, measure the thickness D2 of the wood block 56 in the container 10. (5) Slide the dowel 62 back and forth through a distance D3 and measure the interior length L of the empty container 10 of FIG. 5A–d.

The density of the wood block 56 is given by (W1−W0)/(D1*D2*(L−D3)). (6) Look up the nearest density to the calculated density in the table constructed in step (1). The name of the wood type is on that line.

The second member of this group, the container 10 of FIG. 5B–b, is opaque except for ⅜ inch holes or openings 64 in the center of each of the 4×6 faces and the 1×6 faces. The 1×4 faces each have two ⅜ inch holes or openings 64. Inside the container 10 is a block of wood 58 in the shape of a trapezoid.

The problem presented with the container 10 of FIG. 5B–a is to determine the type of wood in the container 10.

One method of solution is as follows. (1) First, make a table of wood densities from the samples as in the solution of the container 10 of FIG. 5A–a discussed above. (2) Determine the weight W1 of the container 10 of FIG. 5B–a and the weight W0 of the empty duplicate container 10 of FIG. 5B–d. (3) Measure the width D1 of the wood block 58 inside the container 10 by inserting pencils into the opposing holes or openings 64 and observing how far the pencils penetrate these opposing openings 64. Subtracting the sum of the penetrations from the width of container 10 gives the width of the block 58. (4) Measure the thickness D2 of the wood block 58 in the container 10 in a similar fashion. (5) By inserting pencils through the openings 64 in the 1×4 ends of the container 10, determine the long base LB of the trapezoid and the short base of the trapezoid. (6) The density DN of the wood block 58 inside the container 10 is given by DN=(W1−W0)/(D1*D2*(SB+LB)/2). (7) Look up the nearest density to DN in the constructed table. The name of the wood type is on that line.

Group #6 is referred to as The Lever Containers. The containers 10 in Group #6 generally have a transparent front face 12 through which the student can see the entire contents. There is a 1 cm×17 cm×¼ cm plastic lever 66 protruding ½ inch out of the container through a 2×³⁄₁₆ inch slit or opening 68 in a 4×1 inch side of the container.

The kit provided with each container 10 from this group contains a ruler, scale, and a duplicate empty container 10 with spare plastic lever 66. Each kit further contains information in text format pertaining to the mathematics of lever behavior.

Figure 6A:
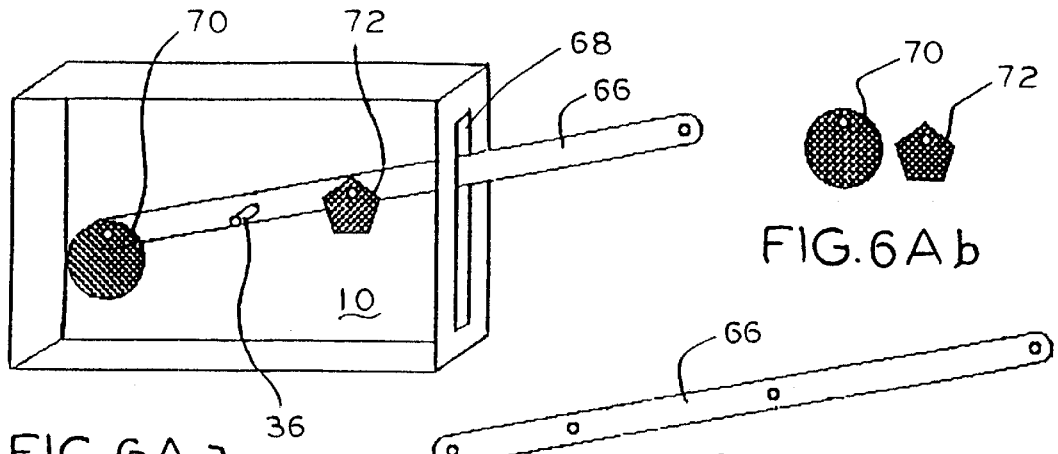
Figure 6A:
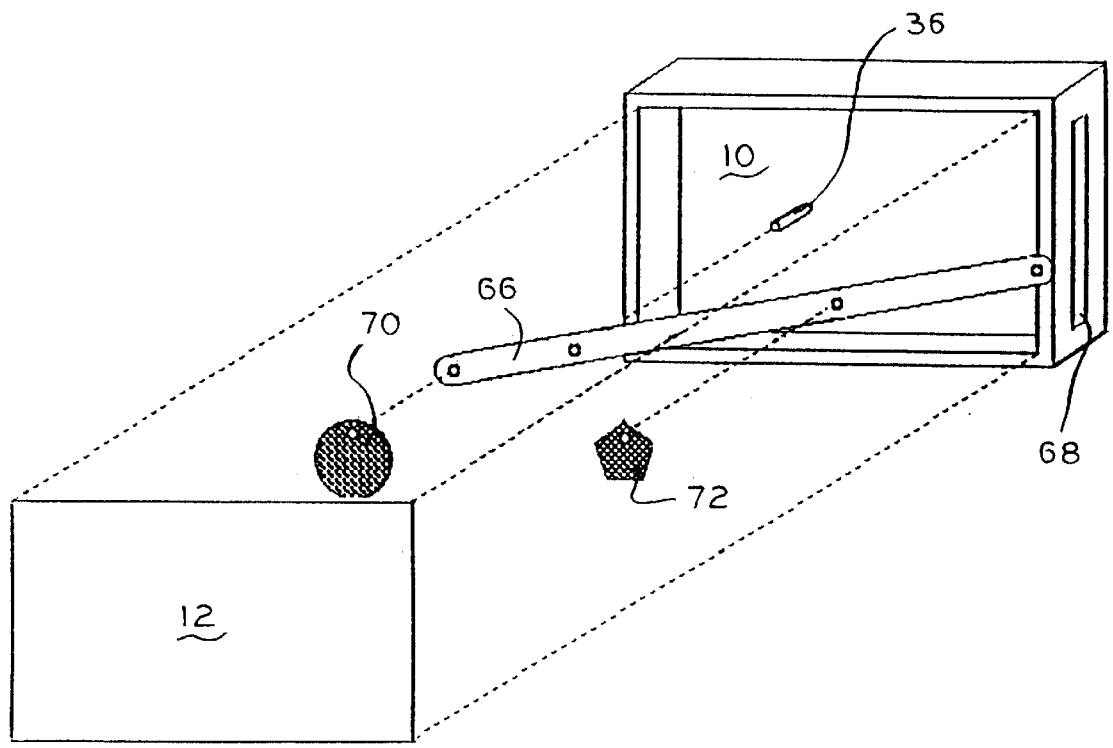

In the first member of this group, the container of FIG. 6A–a, the plastic lever 66 has two attached metal pieces 70 and 72, which could be washers. One metal piece 70, with a mass M1, is fastened to the end of the plastic lever 66 that is in the container 10, while the other metal piece 72, with a mass M2, is otherwise fastened to the lever 66, between the pivot pin 36 and the protruding end of the lever 66. The plastic lever 66 rotates on a pivot pin 36 which is fastened to the 4×6 back face of the container 10.

The problem presented with the container 10 of FIG. 6A–a is to determine the weight M1 of the metal piece 70 on the end of the lever 66.

One method of solution is as follows. (1) Determine the weight W1 of the container 10 of FIG. 6A–a and (2) the weight W0 of the empty duplicate container 10 provided by weighing them on the scale. (3) Put the container 10 of FIG. 6A–a on the scale and push down on the plastic lever 66 until it is level. Let the reading on the scale be W2. (4) Let the distance from piece 70 to the pivot pin 36 be d1, the distance from piece 72 to the pivot pin 36 be d2 and the distance from the pivot pin 36 to the lever end protruding from the container 10 be d3. (5) The metal piece 70 attached to the end of the lever 66 weighs [d3*(W2−W1)+d2*(W1−W0)]/(d1+d2).

For the second member of this group, the container 10 of FIG. 6B–a, the plastic lever 66 has an attached metal piece 70, which could be a washer, fastened to the end of the lever 66. The plastic lever 66 rotates on a pivot pin 36, which is fastened to the 4×6 back face of the container 10. There is a second metal piece 72, which could be a washer, attached to a face of the container 10.

The problem presented with the container 10 of FIG. 6B–a is to determine the weight of each of the metal pieces 70 and 72 in the container 10.

One method of solution is as follows. (1) Determine the weight W1 of container 10 of FIG. 6B–a and (2) the weight W0 of the empty duplicate container 10 provided by weighing them on the scale. Put the container 10 on the scale and push down on the lever 66 so as to level the lever 66. The reading on the scale is W2. (3) Using the ruler, measure the distance D1 from the pivot pin 36 to the center of the metal piece 70 attached to the lever 66. (4) Measure the distance D2 from the pivot pin 36 to the end of the plastic lever 66 extending out of the container 10. The weight of the metal piece 70 on the plastic lever 66 is (W2−W1)*D2/D1 and the second metal piece 72 weighs (W1−W0)−(W2−W1)*D2/D1.

Group #7 is referred to as Miscellaneous Containers. The containers 10 in this group have few common traits. Five members of this group are listed and described in FIGS. 7A–a to 7A–f to 7E–a to 7E–d. The first member of this group, the container 10 of FIG. 7A–a, contains a wheel and axle assembly somewhat resembling a thin yoyo. This yoyo is made from two plastic 1½ inch discs 74 (poker chips) joined by a small dowel or axle 76. The axle 76 is free to roll back and forth astride a thin wood rail 78, resembling a popsicle stick. The rail 78 is fastened at both ends to the 1×4 inch walls of the plastic container 10. The container 10 includes a clear face 12 so that a student can see the contents of the container 10; however, the axle 76 cannot be seen directly, as it is concealed by the disc 74 forming an axle cover.

The problem presented by the container 10 of FIG. 7A–a is to determine the diameter of the axle 76 in the wheel and axle assembly.

One method for the solution is as follows. (1) Allow the yoyo illustrated in FIG. 7A–a to roll the entire length of the container 10 and count the number N of revolutions made. (2) Measure the distance Y through which the yoyo rolled. This will be the entire width of the container 10 less the diameter of the yoyo. (3) The diameter of the axle is given by Y+πN.

The second member of the group, the container 10 of FIG. 7B–a, is an opaque container 10 containing a ¼ inch bolt 80 of about 6 inches, as well as a quantity of ¼ inch internally threaded nuts 82. The head of the bolt 80 protrudes through a ⁵⁄₁₆ inch circular hole or opening 84 in the center of one 1×4 inch face of the container 10. Inside the container 10, some of the nuts 82 are threaded onto the bolt 80 and the remaining nuts 82 are loose within the container 10. Duplicate nuts 82 shown in FIG. 7B–d and a duplicate bolt 80 shown in FIG. 7B–b are provided.

The problem presented by the container 10 of FIG. 7B–a is to determine how many ¼ inch internally threaded nuts 82 are loose in the container 10 and the total number of nuts 82 in the container 10.

One method for the solution of the container 10 of FIG. 7B–a is as follows. (1) Place the container 10 of FIG. 7B–a containing the bolt 80 and nut 82 on a scale to determine its total weight W1. (2) Leaving the container 10 on the scale, pull up on the bolt 80 so that the bolt 80 is free from touching the container 10 and again note the weight W2 on the scale. (3) Determine the weight W0 of the empty container 10 provided, the weight WB of the duplicate bolt 80 shown in FIG. 7B–b, and the weight WN of a duplicate nut 82 shown in FIG. 7B–d. The number of loose nuts is (W2−W0)/WN and the total number of nuts in the container is (W1−W2−WB)/WN.

A third member of the group, the container 10 of FIG. 7C–a, contains several aluminum soft drink cans 86 that are shredded and/or crushed. The container 10 is opaque except for a ⅜ inch hole or opening 88 through which the student can see some of the aluminum of cans 86.

The problem presented with the container 10 of FIG. 7C–a is to determine the number of cans 86 in the container 10 and the present market value of the aluminum within the container 10.

One method for the solution of the container 10 of FIG. 7C–a is as follows. (1) Determine the weight W1 of the container of FIG. 7C–a with the aluminum cans 86 inside and (2) the weight W0 of the duplicate empty container 10 provided. (3) Determine the weight WC of the empty aluminum cans 86. (4) Look up the price P of scrap aluminum in the classified section of the local newspaper. Then the number of cans 86 in the container of FIG. 7C–a is (W1−W0)/WC. The present market value of the aluminum in the container 10 is (W1−W0).P.

A fourth member of the miscellaneous group, the container 10 of FIG. 7D–a, is opaque and contains a rope assembly consisting of an 8 inch piece of clothesline rope 90 to which are attached two 5 inch pieces of rope 92. The assembly has the appearance of the Greek letter π, with the 8 inch section of rope 90 forming the horizontal stroke of the letter π and the 5 inch section of rope 92 forming the vertical strokes of the letter π. One end of each 5 inch piece of rope 92 is fastened to the 8 inch rope 90 at a point approximately 3 inches from the end of the 8 inch rope 90. The container 10 has four ⁵⁄₁₆ inch circular holes 94, one in the center of each of the 1×¼ inch walls. The four loose ends of the rope assembly formed by ropes 90 and 92 protrude through the four holes 94 in the container 10 as illustrated in FIG. 7D–a.

The problem presented with the container 10 of FIG. 7D–a is to determine the total length of the rope 90 and 92 in the rope assembly.

One method for the solution is as follows. (1) In FIG. 7D–a, hold each protruding rope section out as far as possible and measure their respective lengths L1, L2, L3 and L4. (2) Holding one of the ends as far out as possible, measure the length L0 of rope protruding from the opposite side of the container 10. (3) The total length of rope in the rope assembly is L1+L2+L3+L4−L0.

The fifth member of this group, container 10 of FIG. 7E–a, is opaque and contains a swinging lever 96 which behaves as a pendulum. The swinging lever 96 is 14 mm long and is attached at the top of the container 10 with a thin nail in such a way that the lever 96 can swing back and forth. Duplicate levers 98 of various lengths are provided. The problem presented with the container 10 of FIG. 7E–a is to determine the length of the swinging lever 96 in the container 10.

One method of solution for the container 10 of FIG. 7E–a is as follows. (1) Using each of the duplicate levers 98 illustrated in FIG. 7E–c, hang on a nail and allow to swing for ten swings. Make a table of the length of the tested lever 98 and the time for ten swings in the following format:

| Length | Time |
|--------|------|
| 6 | 2 |
| 8 | 3 |
| 14 | 4 |
| 17 | 5 |

(2) Move the container shown in FIG. 7E–a so that the lever 96 inside swings and count the time T for ten swings of the lever 96. (3) Compare the time T to the right column of the table constructed and find the closest time. The length on that row is the length of the lever 96.

Having thus described the invention, various embodiments, alterations, and modifications will occur to those skilled in the art. Such modifications are intended to be within the scope of the invention as defined by the appended claims.

I claim:

1. An educational apparatus comprising:
   a substantially closed opaque primary vessel;
   at least one item in the primary vessel selected from a group of various types of predetermined items which differ only in color;
   a means for measuring the vessels and the items that includes
      a weighing scale and
      an opening in the primary vessel permitting visual inspection of some of the at least one item.

2. The apparatus of claim 1 wherein the types of predetermined items include at least two types of items that differ in color and weight.

3. An educational apparatus comprising:
   a substantially closed opaque vessel;
   a plurality of items contained within the vessel, each item selected from a group consisting of two types of predetermined items including interconnected chain links of different sizes and weights, where at least one link of one of the two types extends through a first opening in the vessel and at least one link of the other of the two types extends through a second opening in the vessel; and a means for obtaining information relevant to the plurality of items.

4. An educational apparatus comprising:
a substantially closed vessel;
a rail extending between sides of the vessel;
an item with an axle rotatably supported on the rail;
axle covers attached to opposite ends of the axle; and
a means for obtaining information relevant to the item comprising a transparent surface within the vessel to permit observing the rotation of one of the axle covers.

5. An educational apparatus comprising:
a substantially closed opaque vessel;
at least one item in the vessel selected from a group of various types of predetermined items which differ in density;
a means for obtaining information on the vessel and the item that includes
a weighing scale and
at least one opening on each of the three mutually orthogonal sides of the vessel, each said opening permitting calculation of one dimension of the item within the vessel.

6. The educational apparatus of claim 5, wherein said item is trapezoidal in shape and one said side of said container includes two said openings.

7. An educational apparatus comprising:
a substantially closed opaque vessel;
at least two items in the vessel selected from a group of various types of predetermined items;
an arm pivotally mounted within said vessel on a fixed pivot pin and visible through a transparent section of a vessel wall, the at least two items mounted on said pivot arm;
a means for obtaining information on at least one item that includes a pivot arm pivoting means.

8. The educational apparatus of claim 7, wherein two said items are attached to said pivot arm on opposite sides of said pivot pin and positioned equidistance from said pivot pin, and wherein said pivot arm pivoting means includes an opening through said vessel positioned above a mounting position of one said item on said pivot arm.

9. The educational apparatus of claim 7, wherein two said items are attached to said pivot arm on opposite sides of said pivot pin and positioned equidistance from said pivot pin, and wherein said pivot arm pivoting means includes an opening through said vessel positioned above said pivot arm and a rod attached to said pivot arm extending through said opening.

10. The educational apparatus of claim 7, wherein two said items are attached to said pivot arm on opposite sides of said pivot pin, and wherein said pivot arm pivoting means includes an opening through said vessel with one end of said pivot arm extending through said opening.

11. The educational apparatus of claim 7, wherein two said items are within said vessel and only one said item is mounted to said pivot arm, and wherein said pivot arm pivoting means includes an opening through said vessel with one end of said pivot arm extending through said opening.

12. An educational apparatus comprising:
a substantially closed opaque vessel;
at least one item in the vessel selected from a group of various types of predetermined items;
a spring member within said vessel, one end of the spring member being attached to an opening in the vessel, wherein the at least one item is selectably supportable by the spring member;
a means for obtaining information on at least one item that includes a transparent surface for observing the deflection of the spring member.

13. The educational apparatus of claim 12, wherein one said item is attached to said vessel and unsupported by said spring member, and further including an opening in said vessel above said spring member providing for deflection of said spring member from the exterior of said vessel.

14. An educational apparatus comprising:
a substantially closed vessel;
a plurality of items comprising crushed aluminum cans;
a means for obtaining information relevant to the plurality of items.

15. An educational apparatus comprising:
a substantially closed vessel;
a threaded bolt loosely extending through an opening in the vessel;
a plurality of items comprising threaded nuts;
at least one of said nuts threadably received on the threaded bolt; and
a means for obtaining information relevant to the plurality of items, including said opening and threaded bolt.

16. An educational apparatus comprising:
a substantially closed opaque primary vessel;
a means for obtaining information including four openings in the vessel, at least two of which are on opposite sides of the vessel;
at least one item in the primary vessel comprising a length of rope including a base segment extending through said openings on opposite sides and two rope extensions attached to the base segment at spaced locations along the base segment, each rope extension extending through one opening.

17. A mathematics education kit comprising:
a substantially closed opaque primary vessel;
a substantially closed reference vessel that is substantially identical to the primary vessel;
at least one item in the primary vessel selected from a group of various types of predetermined items;
a reference item for each item in the primary vessel, each reference item being substantially identical to the corresponding item in the primary vessel; and
a means for measuring the vessels and the items includes a weighing scale and an opening in the primary vessel permitting visual inspection of some of the at least one item.

18. The mathematics education kit of claim 17, where there are at least two items within the primary vessel, the at least two items are selected from two types of predetermined items that differ only in color.

19. A mathematics education kit comprising:
a substantially closed opaque primary vessel;
a substantially closed reference vessel that is substantially identical to the primary vessel;
at least two items in the primary vessel selected from a group of various types of predetermined items, where each type of predetermined items differ in size and weight and at least two types of predetermined items are in the primary vessel;

a reference item for each item in the primary vessel, each reference item being substantially identical to the corresponding item in the primary vessel; and a means for measuring the vessels and the items that includes a weighing scale.

20. The mathematics education kit of claim 19 where at least one item partially extends through an opening in the primary vessel.

21. The mathematics education kit of claim 20 where the at least two items consist of interconnected links of chain.

22. A mathematics education kit comprising:

a substantially closed opaque primary vessel;

a substantially closed reference vessel that is substantially identical to the primary vessel;

at least one item in the primary vessel selected from a group of various types of predetermined items consisting of chain links that differ only in size and weight;

a reference item for each item in the primary vessel, where each reference item is substantially identical to the corresponding item in the primary vessel; and a means for measuring the vessels and the items that includes a weighing scale and an opening in the primary vessel to permit visual inspection of some of the at least one item.

23. A mathematics education kit comprising:

a substantially closed opaque rectangular vessel with four openings, at least one opening on each of three mutually orthogonal sides of the vessel and two openings on opposite sides of the vessel;

at least one item contained in the primary vessel, the at least one item including a the length of rope and two rope extensions loosely contained in the vessel, the length of rope extending through openings on opposite sides of the vessel and the two rope extensions attached to the length of rope at spaced locations, each rope extension extending through an opening in the vessels;

a means for obtaining information relevant to the at least one item comprising the four openings, each opening permitting calculation of one dimension of the at least one item within the vessel.

24. The mathematical education kit of claim 23 where the at least one item is trapezoidal and one side of the vessel includes two openings.

25. A mathematics education kit comprising:

a substantially closed primary vessel;

a substantially closed reference vessel substantially identical to the primary vessel;

at least one item contained within the primary vessel, selected from a group of various types of predetermined items;

at least one reference item corresponding to each of the various types of predetermined items, each reference item being substantially identical to the corresponding type of predetermined item;

an arm pivotally mounted within the primary vessel on a fixed pivot pin, the at least one item mounted on the pivot arm, the pivot arm further including means for pivoting the pivot arm; and a means for measuring the vessel and the at least one item comprising a weighing scale.

26. The mathematics education kit of claim 25 where there are at least two items contained within the primary vessel, attached to the pivot arm on opposite sides of the pivot pin, and positioned equidistant from the pivot pin, the pivoting means including an opening in the primary vessel above one of the items attached to the pivot arm.

27. The mathematics education kit of claim 25 where there are at least two items contained within the primary vessel, attached to the pivot arm on opposite sides of the pivot pin, and positioned equidistant from the pivot pin, the pivoting means including an opening in the primary vessel above one of the items attached to the pivot arm and a rod attached to the pivot arm extending through the opening.

28. The mathematics education kit of claim 25 where there are at least two items contained within the primary vessel, attached to the pivot arm on opposite sides of the pivot pin, and positioned equidistant from the pivot pin, and the pivoting means includes an opening in the primary vessel with one end of the pivot arm extending through the opening.

29. The mathematics education kit of claim 25 where there are at least two items contained within the primary vessel, one of the two items is attached to the pivot arm, and the pivoting means includes an opening in the primary vessel with one end of the pivot arm extending through the opening.

30. A mathematics education kit comprising:

a substantially closed primary vessel;

a substantially closed reference vessel substantially identical to the primary vessel;

at least one item contained within the primary vessel, selected from a group of various types of predetermined items;

at least one reference item corresponding to each of the various types of predetermined items, each reference item being substantially identical to the corresponding type of predetermined item;

a spring within the primary vessel, such that one end of the spring is attached to the primary vessel and the at least one item is selectably supported by the spring;

a transparent surface within the primary vessel to permit observation of the spring deflection; and a means for measuring the vessel and the at least one item comprising a weighing scale.

31. The mathematics education kit of claim 30, where one item is attached to the primary vessel and unsupported by the spring, and where an opening in the primary vessel above the spring provides for deflection of the spring from the exterior of the primary vessel.

32. A mathematics education kit comprising:

a substantially closed opaque primary vessel;

a substantially closed reference vessel that is substantially identical to the primary vessel;

at least one item in the primary vessel selected from a group of various types of predetermined items;

a reference item for each item in the primary vessel, each reference item being substantially identical to the corresponding item in the primary vessel;

a means for measuring the vessels and the items includes a weighing scale; and, said items comprising crushed aluminum cans.

33. A mathematics education kit comprising:

a substantially closed opaque primary vessel;

a substantially closed reference vessel that is substantially identical to the primary vessel;

at least one item in the primary vessel selected from a group of various types of predetermined items;

a reference item for each item in the primary vessel, each reference item being substantially identical to the corresponding item in the primary vessel;

a threaded bolt loosely extending through an opening into said primary vessel, wherein the at least one item includes a plurality of threaded nuts threadably received on the threaded bolt;

a means for measuring the vessels and the items includes a weighing scale.

* * * * *

UNITED STATES PATENT AND TRADEMARK OFFICE
CERTIFICATE OF CORRECTION

PATENT NO. : 5,876,212
DATED : March 2, 1999
INVENTOR(S) : Paul G. Hartung

It is certified that error appears in the above-identified patent and that said Letters Patent is hereby corrected as shown below:

Column 13, line 10, delete "$Y + \pi N$" and insert --$Y \div \pi N$--

Column 14, line 52, delete "vessels" and insert --vessel--

Column 17, line 37, delete "vessels" and insert --vessel--

Signed and Sealed this

Third Day of August, 1999

Attest:

Q. TODD DICKINSON

Attesting Officer

Acting Commissioner of Patents and Trademarks